(12) United States Patent
Iida et al.

(10) Patent No.: US 7,768,875 B2
(45) Date of Patent: Aug. 3, 2010

(54) UNDERWATER SOUNDING APPARATUS CAPABLE OF CALCULATING FISH QUANTITY INFORMATION ABOUT FISH SCHOOL AND METHOD OF SUCH CALCULATION

(75) Inventors: Kohji Iida, Hakodate (JP); Yasushi Nishimori, Nishinomiya (JP); Emi Okazaki, Nishinomiya (JP)

(73) Assignee: Furuno Electric Co., Ltd., Hakodate (JP)

( * ) Notice: Subject to any disclaimer, the term of this patent is extended or adjusted under 35 U.S.C. 154(b) by 388 days.

(21) Appl. No.: 11/662,188

(22) PCT Filed: Mar. 28, 2005

(86) PCT No.: PCT/JP2005/006538

§ 371 (c)(1),
(2), (4) Date: Mar. 8, 2007

(87) PCT Pub. No.: WO2006/038330

PCT Pub. Date: Apr. 13, 2006

(65) Prior Publication Data

US 2008/0031092 A1  Feb. 7, 2008

(30) Foreign Application Priority Data

Oct. 1, 2004  (JP) ............................. 2004-290828

(51) Int. Cl.
 *H04B 11/00* (2006.01)
(52) U.S. Cl. ..................................................... 367/131
(58) Field of Classification Search ............ 367/81–191
See application file for complete search history.

(56) References Cited

U.S. PATENT DOCUMENTS

| | | | |
|---|---|---|---|
| 7,327,636 B2 * | 2/2008 | Nishimori et al. ............ 367/131 |
| 2003/0202426 A1 * | 10/2003 | Ishihara et al. ............... 367/103 |

FOREIGN PATENT DOCUMENTS

| | | | |
|---|---|---|---|
| JP | 48-26299 | | 8/1973 |
| JP | 57-62026 | B2 | 12/1982 |
| JP | 61-167570 | U | 10/1986 |
| JP | 62-285086 | A | 12/1987 |
| JP | 03219818 | A * | 9/1991 |
| JP | 10-197622 | A | 7/1998 |
| JP | 11-316277 | A | 11/1999 |
| JP | 2003-202370 | | 7/2003 |
| JP | 2003-202370 | A | 7/2003 |

* cited by examiner

*Primary Examiner*—Thomas H Tarcza
*Assistant Examiner*—Luke D Ratcliffe
(74) *Attorney, Agent, or Firm*—Birch, Stewart, Kolasch & Birch, LLP.

(57) ABSTRACT

An underwater sounding apparatus includes a transmitter section (3) for transmitting an acoustic signal in a specific direction underwater from a ship, a receiver section (4) for receiving an echo reflected from inside a fish school FS as a result of the aforementioned transmitted acoustic signal by means of a receiving beam, and a signal processing section (5) for processing signals picked up by the aforementioned receiving beam. The signal processing section (5) calculates fish quantity information about the aforementioned fish school FS by integrating equivalent input sound intensities obtained by the aforementioned receiving beam in specific three-dimensional directions.

13 Claims, 17 Drawing Sheets

UNDERWATER SOUNDING APPARATUS CAPABLE OF CALCULATING FISH QUANTITY INFORMATION ABOUT FISH SCHOOL AND METHOD OF SUCH CALCULATION

TECHNICAL FIELD

The present invention relates generally to an underwater sounding apparatus, such as a scanning sonar or a bottom sounding sonar apparatus, for detecting a fish school by transmitting an ultrasonic signal and forming a receiving beam and, more particularly, the invention pertains to underwater sounding apparatuses capable of calculating fish quantity information about a fish school.

BACKGROUND ART

Acoustic sounding apparatuses, such as fish-finding echo sounders and scanning sonars, are conventionally used as means for detecting underwater fish schools (refer to patent document 1 "Japanese Examined Patent Publication No. 1973-26299" and patent document 2 "Japanese Unexamined Patent Publication No. 2003-202370," for example). Installed on a ship, a fish-finding echo sounder transmits a beam of ultrasonic sounding waves (acoustic waves) vertically beneath the ship's hull to search for and detect fish schools existing below the ship. A scanning sonar, also installed on a ship, transmits a beam of acoustic waves into underwater areas surrounding the ship to scan the surrounding areas and detect fish schools present in these areas. A result of search carried out by such acoustic sounding apparatus is presented as a scanned image in the form of a specific cross section of a detected fish school.

From a fisherman's point of view, however, it is preferable to recognize not only a scanned image of a detected fish school in the form of a specific cross section but also fish quantity information about the fish school. To achieve this, the prior art proposes a scanning sonar provided with horizontal mode in which the scanning sonar scans a full-circle area as well as vertical mode in which the scanning sonar scans a generally vertical fan-shaped cross sectional area (refer to patent document 2, for example). This scanning sonar presents scanned images obtained in both the horizontal mode and the vertical mode. The fisherman recognizes the shape of a fish school in its entirety and estimates fish quantity information about the fish school. By comparison, a fish-finding echo sounder does not allow the fisherman to recognize the shape of a fish school in its entirety, because the fish-finding echo sounder transmits an acoustic sounding beam vertically downward from the ship.

It is however not so easy for a fisherman to recognize a relationship between the horizontal and vertical mode images with respect to the shape of an entire fish school, for example, based on the scanned images obtained in the horizontal mode and the vertical mode, and this skill of recognition greatly depends on experience of individual fishermen. Furthermore, if fish quantity information about a fish school is to be estimated based on the horizontal and vertical mode images, it is quite likely that different fishermen will differently judge the displayed images, resulting in variations in obtained data. Additionally, estimated values of the fish quantity information about the fish school thus obtained are no more than qualitative results.

The present invention has been made in light of the aforementioned problems of the prior art and, thus, it is an object of the invention to provide an underwater sounding apparatus which can calculate fish quantity information about a fish school in a quantitative manner with little variations as well as a method of performing such calculation regardless of experience of fishermen.

DISCLOSURE OF THE INVENTION

In the present invention, features summarized below may be implemented individually or in combination as appropriate.

To solve the aforementioned problems, an underwater sounding apparatus according to the present invention includes a transmitter for transmitting an acoustic beam in a specific direction underwater from a ship, a receiver for receiving an echo reflected from a fish school resulting from the aforementioned transmitted acoustic signal by means of a receiving beam, and a signal processor for processing signals picked up by the aforementioned receiving beam and calculating fish quantity information about the aforementioned fish school by integrating data obtained by the aforementioned receiving beam in specific three-dimensional directions.

As discussed herein, the "transmitter" and the "receiver" may be configured either as separate units serving functions of transmission and reception, respectively, or as a single unit serving the functions of both transmission and reception.

A method of calculating fish quantity information about a fish school according to the present invention includes a step of transmitting an acoustic beam in a specific direction underwater, a step of receiving an echo reflected from the fish school resulting from the aforementioned transmitted acoustic signal by means of a receiving beam, and a step of calculating the fish quantity information about the aforementioned fish school by integrating data obtained by the aforementioned receiving beam in specific three-dimensional directions.

According to these features, the data obtained by the receiving beam formed to receive the echo reflected from inside the fish school is integrated in the three-dimensional directions and the fish quantity information about the fish school is calculated based on the result of such integration. It is therefore possible to easily recognize the quantity information about the fish school with high accuracy without recognizing a relationship between a scanned image in horizontal mode and a scanned image in vertical mode. Also, it is possible to obtain stable data since the fish quantity information about the fish school thus calculated does not depend on an estimator of this kind of fish quantity information.

In the underwater sounding apparatus according to the present invention, the aforementioned receiver may be able to form the receiving beam in specific two-dimensional directions. In this case, the aforementioned signal processor integrates the aforementioned data in the three-dimensional directions including the aforementioned two-dimensional directions and a specific one-dimensional direction intersecting the aforementioned two-dimensional directions.

A method of calculating fish quantity information about a fish school according to the present invention includes a step of transmitting an acoustic beam in specific two-dimensional directions underwater, a step of receiving an echo reflected from the fish school resulting from the aforementioned transmitted acoustic signal by means of a receiving beam, and a step of calculating the fish quantity information about the aforementioned fish school by integrating data obtained by the aforementioned receiving beam in the aforementioned two-dimensional directions and a specific one-dimensional direction intersecting the aforementioned two-dimensional directions.

According to these features, it is possible to recognize the quantity information about the fish school by performing integration in the specific two-dimensional directions and the one-dimensional direction intersecting the two-dimensional directions. Accordingly, it is only needed to transmit and receive acoustic waves in the specific two-dimensional directions and, thus, it is possible to simplify the structure of the underwater sounding apparatus and recognize the quantity information about the fish school with high accuracy.

In the underwater sounding apparatus according to the present invention, the aforementioned specific two-dimensional directions may be directions generally along a plane which contains a first horizontal axis in a first plane containing a first axis extending in a horizontally forward direction from the ship and a second axis extending in a horizontal direction perpendicular to the aforementioned first axis from the aforementioned ship, as well as a downward-pointing axis in a third plane containing a second horizontal axis extending perpendicular to the aforementioned first horizontal axis in the first plane and a third axis extending vertically downward from the aforementioned ship. In this case, the aforementioned specific one-dimensional direction is preferably a moving direction of the aforementioned ship.

According to this structure, it is possible to easily integrate the data obtained by the receiving beam by running the ship while forming the receiving beam in the aforementioned two-dimensional directions. Especially because the one-dimensional direction is the moving direction of the ship, it is only necessary to run the ship in one direction. In order to obtain an accurate result, it is desirable to run the ship along a straight course without meandering.

In the underwater sounding apparatus according to the present invention, the aforementioned first horizontal axis may be either of the aforementioned second axis and an axis which intersects the aforementioned second axis. In this case, the aforementioned downward-pointing axis is preferably either of the aforementioned third axis and an axis which intersects the aforementioned third axis. This means that four combinations of the first horizontal axis and the downward-pointing axis are available. These are the combination of the second axis and the third axis, the combination of the second axis and the axis intersecting the third axis, the combination of the axis intersecting the second axis and the third axis, and the combination of the axis intersecting the second axis and the axis intersecting the third axis.

According to these features, it is possible to easily calculate the fish quantity information about the fish school by applying or adapting a principle of calculating the fish quantity information using a cylindrical coordinate system regardless of which one of the aforementioned combinations of the first horizontal axis and the downward-pointing axis is used.

In the underwater sounding apparatus according to the present invention, the aforementioned specific two-dimensional directions may be directions generally along an umbrellalike surface which is formed around the aforementioned ship, intersecting a first plane containing a first axis extending in a horizontally forward direction from the ship and a second axis extending in a horizontal direction perpendicular to the aforementioned first axis. In this case, the aforementioned specific one-dimensional direction is preferably a moving direction of the aforementioned ship.

As discussed herein, the expression "formed around the ship" is not necessarily limited to an arrangement in which the umbrellalike surface is formed all around the ship but is meant to imply an arrangement in which the umbrellalike surface is formed only in part of a full-circle area surrounding the ship.

According to this structure, it is possible to easily integrate the data obtained by the receiving beam by running the ship while forming the receiving beam along the umbrellalike surface formed around the ship. Especially because the one-dimensional direction is the moving direction of the ship, it is only necessary to run the ship in one direction. In order to obtain an accurate result, it is desirable to run the ship along a straight course without meandering.

In the underwater sounding apparatus according to the present invention, the aforementioned specific two-dimensional directions may be directions generally along a second plane which contains a second axis extending in a horizontal direction perpendicular to a first axis extending in a horizontally forward direction from the ship and a third axis extending vertically downward from the aforementioned ship. In this case, the aforementioned specific one-dimensional direction is preferably a direction in which the aforementioned second plane is rotated generally about the third axis extending vertically downward from the aforementioned ship.

According to this structure, it is possible to integrate the data obtained by the receiving beam by successively varying azimuthal direction in which the receiving beam is formed while forming the receiving beam in directions generally along an imaginary vertical cross section containing an imaginary vertical axis extending vertically downward from the ship. This is advantageous in that it is possible to integrate the data obtained by the receiving beam in the three-dimensional directions without running the ship.

In the underwater sounding apparatus according to the present invention, the aforementioned specific two-dimensional directions may be directions generally along an umbrellalike surface which is formed around the aforementioned ship, intersecting a first plane containing a first axis extending in a horizontally forward direction from the ship and a second axis extending in a horizontal direction perpendicular to the aforementioned first axis. In this case, the aforementioned specific one-dimensional direction is preferably a direction in which an angle of intersection between the aforementioned first plane and the aforementioned umbrellalike surface is varied.

According to this structure, it is possible to integrate the data obtained by the receiving beam by varying the angle at which the umbrellalike surface intersects the first plane (or the angle of transmit/receive direction of the acoustic beam with respect to the first plane) while forming the receiving beam in the directions generally along the umbrellalike surface formed around the ship. This is also advantageous in that it is possible to integrate the data obtained by the receiving beam in the three-dimensional directions without running the ship.

In the underwater sounding apparatus according to the present invention, the aforementioned specific two-dimensional directions may be directions generally along a plane which contains a first horizontal axis in a first plane containing a first axis extending in a horizontally forward direction from the ship and a second axis extending in a horizontal direction perpendicular to the aforementioned first axis from the aforementioned ship, as well as a downward-pointing axis in a third plane containing a second horizontal axis extending perpendicular to the aforementioned first horizontal axis in the first plane and a third axis extending vertically downward from the aforementioned ship, the aforementioned downward-pointing axis intersecting the aforementioned third axis. In this case, the aforementioned specific one-dimensional direction is preferably a direction in which an angle of intersection between the aforementioned third axis and the aforementioned downward-pointing axis is varied.

According to this structure, it is possible to integrate the data obtained by the receiving beam by varying the angle of intersection between the third axis and the downward-pointing axis while forming the receiving beam in the directions generally along the plane which contains the first horizontal axis and the downward-pointing axis intersecting the third axis in the third plane containing the second horizontal axis and the third axis. This is also advantageous in that it is possible to integrate the data obtained by the receiving beam in the three-dimensional directions without running the ship.

In the underwater sounding apparatus according to the present invention, the aforementioned data is equivalent input sound intensity which has been compensated for spreading loss and absorption loss of the transmitted and received acoustic signal. This makes it possible to realize a specific configuration.

BEST MODES FOR CARRYING OUT THE INVENTION

The present invention proposes an underwater sounding apparatus in which an algorithm is implemented to allow estimation of fish quantity information about a fish school. With the underwater sounding apparatus of this invention, it is possible to estimate the fish quantity information about a fish school FS based on one of principles of calculation using a cylindrical coordinate system and a spherical coordinate system. In particular, if backscattering strength Ts of a single fish constituting the fish school FS is known, it is possible to estimate the number N of fishes in the fish school FS.

Here, the "backscattering strength Ts of a single fish" is an index obtained from an echo reflected by the single fish when an acoustic signal is emitted toward the single fish. It is known that the backscattering strength Ts of a single fish is approximately proportional to the square of the length of the single fish.

Also, the "fish quantity information about a fish school FS" referred in this invention means either an approximate value of the number N of individual fishes in the fish school FS chosen as a target or a value N×Ts obtained by multiplying the number N of the individual fishes in the fish school FS by the backscattering strength Ts of each single fish constituting the fish school FS. Thus, the underwater sounding apparatus according to the present invention may be of a type which can calculate only the number N of the individual fishes in the fish school FS or only the value N×Ts of that fish school FS, or both of these quantities.

The following discussion explains as a first embodiment the principle of calculating the fish quantity information using a cylindrical coordinate system and examples using this principle, and as a second embodiment the principle of calculating the fish quantity information using a spherical coordinate system and examples using this principle with reference to individual drawings.

In explaining the individual embodiments, the following discussion deals with a scanning sonar (multibeam sonar) capable of three-dimensional scanning as an example of the underwater sounding apparatus of the present invention. It is assumed that the scanning sonar has a configuration shown in a control block diagram of FIG. 1.

Figure 1:
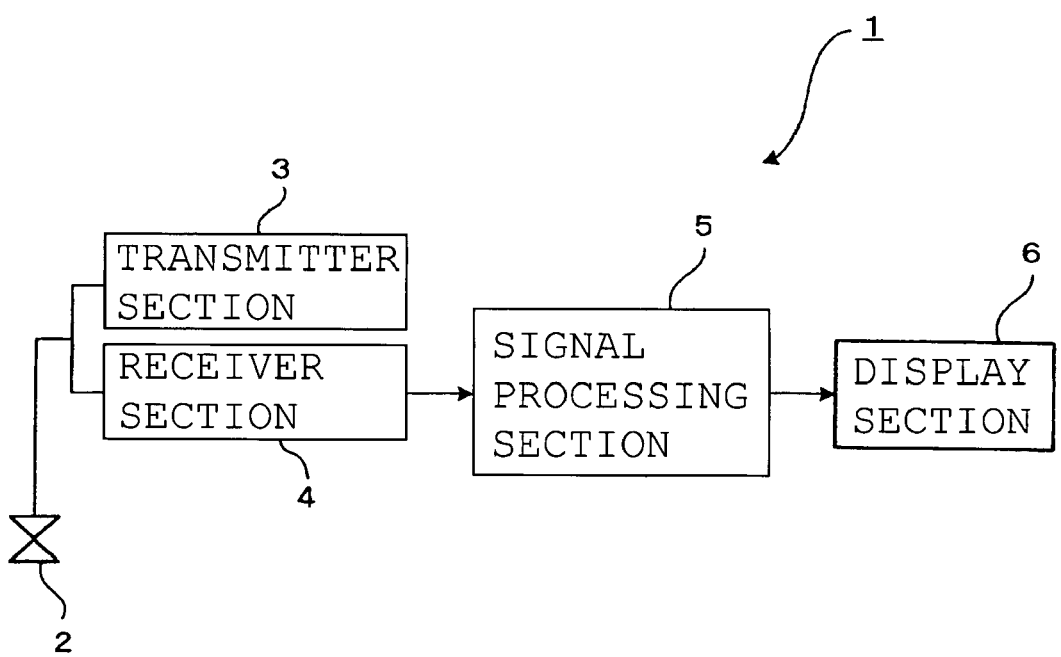
FIG. 1 is a control block diagram of a scanning sonar.

Referring to FIG. 1, a scanning sonar 1 includes a transducer 2, a transmitter section 3, a receiver section 4, a signal processing section 5 and a display section 6. The transducer 2 is an acoustic transmit/receive device installed on a hull bottom of a ship 7 as will be later discussed specifically. The transmitter section 3 transmits an acoustic signal in the form of a beam through the transducer 2. (This acoustic signal is hereinafter referred to as an "acoustic sounding beam.") The receiver section 4 forms a receiving beam oriented in specific two-dimensional directions and receives an echo reflected by a target, such as a fish school, by means of the receiving beam. The signal processing section 5 processes signals picked up by the receiving beam and calculates fish quantity information about the fish school. Processing operation performed by the signal processing section 5 will be later discussed in detail with reference to the first and second embodiments. Signals processed by the signal processing section 5 include equivalent input sound intensity, for instance. The display section 6 presents, in addition to an ordinary sonar echo image, equivalent input sound intensity $P_M^2$ obtained by the receiving beam and the fish quantity information about the fish school calculated by the signal processing section 5.

The expression "the receiver section 4 forms a receiving beam oriented in specific two-dimensional directions" mentioned above may be used to mean either a mode in which a large number of one-dimensionally converged receiving beams are simultaneously formed in multiple two-dimensional directions or a mode in which a single receiving beam is sequentially formed in multiple two-dimensional directions.

In explaining the first and second embodiments, the position of the transducer 2 installed on the hull bottom of the ship 7 is taken as origin O of each coordinate system, an imaginary axis extending in a horizontally forward direction from the ship 7 (that is, a moving direction of the ship 7 if the ship 7 is running) is referred to as an x-axis (first axis), an imaginary axis extending in a horizontal direction perpendicular to the x-axis from the ship 7 is referred to as a y-axis (second axis), and an imaginary axis extending vertically downward from the origin O is referred to as a z-axis (third axis).

Further, an imaginary plane containing the x-axis and the y-axis is referred to as an xy-plane (first plane), an imaginary plane containing the x-axis and the z-axis is referred to as a xz-plane (second plane), an imaginary plane containing the y-axis and the z-axis is referred to as an yz-plane. Also, a direction in which the acoustic sounding beam is emitted is referred to as an r direction. Here, the r direction makes an angle θ with the xy-plane and the orthogonal projection of the r direction on the xy-plane makes an angle φ with the x-axis in a clockwise direction.

First Embodiment

The principle of calculating the fish quantity information by use of a cylindrical coordinate system and five specific forms thereof using this principle are described below with reference to First to Fifth Examples. As described in the first embodiment, the ship 7 moves in a positive direction of the x-axis.

Figure 2:
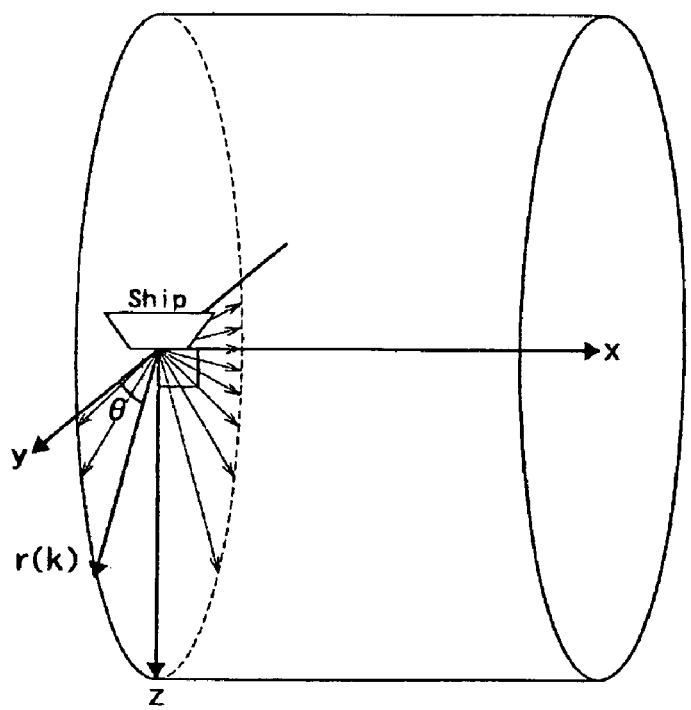
FIG. 2 is a diagram showing a model of a cylindrical coordinate system.
Figure 3:
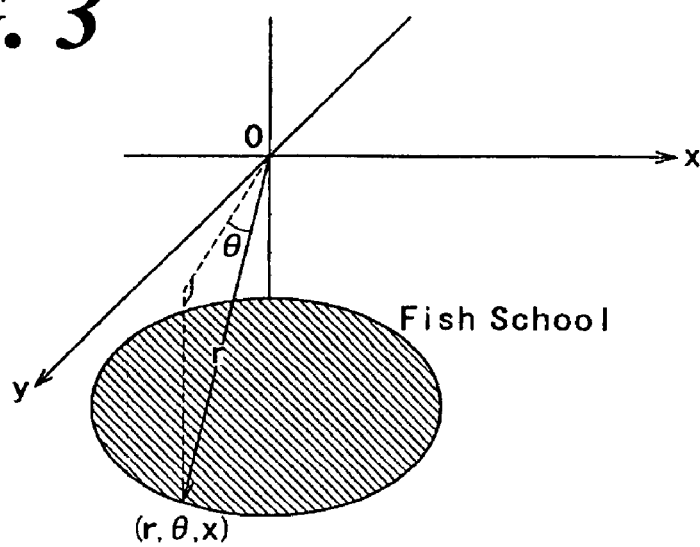
FIG. 3 is a diagram showing a positional relationship between a transducer and a fish school.

Principle of Fish Quantity Information Calculation Using Cylindrical Coordinate System The principle of fish quantity information calculation using the cylindrical coordinate system is explained with reference to FIGS. 2 and 3, of which FIG. 2 is a diagram showing a model of the cylindrical coordinate system, and FIG. 3 is a diagram showing a positional relationship between the transducer 2 (origin O) and a fish school FS.

Discussed below is a situation in which an acoustic sounding beam emitted into a body of sea water from the transducer 2 is reflected from inside the fish school FS and the transducer 2 receives an echo thus reflected by a receiving beam as illustrated in FIG. 2. Here, it is assumed that the transducer 2 has a spherical shape. This means that dependence of transmit signal intensity $P_O^2$ and equivalent beam width ψ on the angle θ the r direction makes with the xy-plane is not to be taken into consideration Referring to FIG. 2, the scanning sonar emits the acoustic beam in a depth direction into the body of sea water while varying the angle θ of the acoustic beam with respect to the xy-plane (or the angle with the y-axis in the yz-plane), where the angle θ is within a range expressed by $0 \leq \theta \leq \pi/2$ (rad) and the ship 7 runs in the positive direction of the x-axis while steering the acoustic beam in the yz-plane.

Expressing coordinates of each point along the acoustic beam emitted from the ship 7 as (r, θ, x) as illustrated in FIG. 3, the density of the fish school FS is expressed as n(r, θ, x) and the total number N of fishes in the fish school can be expressed by equation (1) below. Concerning coordinates of individual points along the acoustic beam in the present embodiment discussed below, the kth coordinate in the r direction is expressed as r(k), the ith coordinate in a θ direction is expressed as θ(i), and the jth coordinate in an x direction is expressed as x(j).

$$N = \int n(r, \theta, x) \cdot r \, dr \, d\theta \, dx \tag{1}$$

When a transmitting beam emitted in a direction of (r, θ, x) from the transducer 2 is reflected by the fish school FS and the transducer 2 receives the echo thus reflected by the receiving beam, the equivalent input sound intensity $P_M^2$ obtained from the received echo is processed by the signal processing section 5. A sequence of operations performed on the equivalent input sound intensity $P_M^2$ by the signal processing section 5 is explained below.

Given the beam angle θ with respect to the y-axis in the yz-plane, range r in the r direction and range x in the x-axis direction, the equivalent input sound intensity $P_M^2(r, \theta, x)$ can be expressed by equation (2) below:

$$P_M^2(r, \theta, x) = Ts \cdot \frac{P_0^2}{r^4}(e^{-2\alpha r})^2 \cdot \int n(r', \theta', x') \cdot h(r', \theta', x'; r, \theta, x) \cdot r' \cdot dr' d\theta' dx' \tag{2}$$

where $P_O^2$ is the transmit signal intensity, α is an absorption loss coefficient, and h is a point spread function.

Figure 4A:
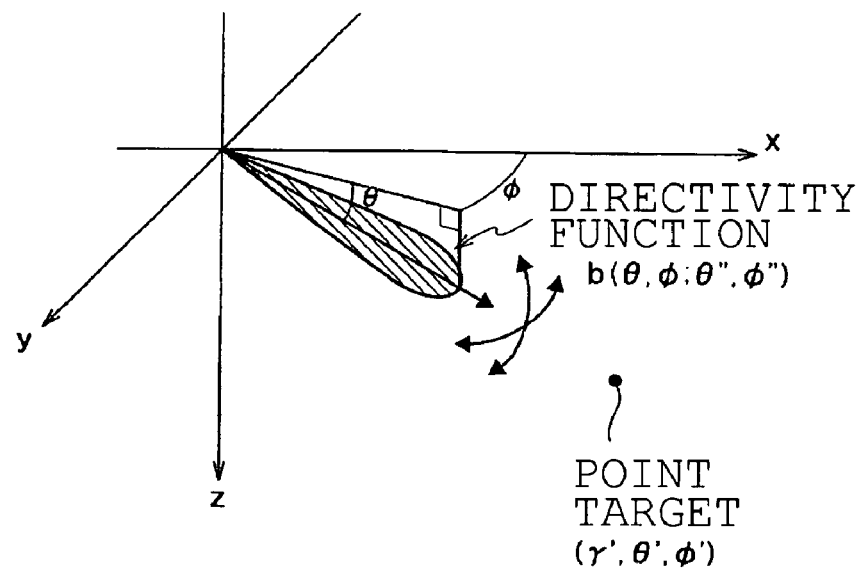
FIG. 4A shows a coordinate system in which an acoustic beam is successively steered in θ and φ directions to perform two-dimensional continuous scanning and FIG. 4B shows a result of imaging obtained by two-dimensional continuous scanning of a point target.
Figure 4B:
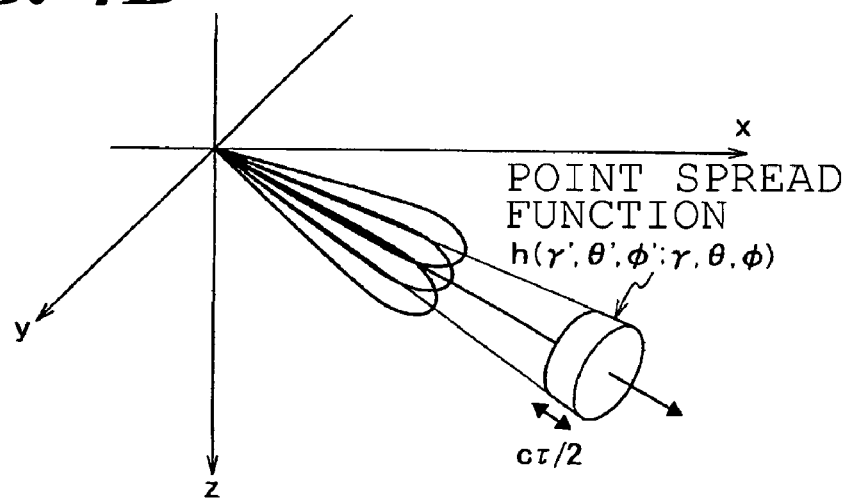

Here, the point spread function is explained with reference to FIGS. 4A and 4B. FIG. 4A shows a coordinate system in which the acoustic beam is successively steered in θ and φ directions to perform two-dimensional continuous scanning and FIG. 4B shows a result of imaging obtained by two-dimensional continuous scanning of a point target. A transmit-receive product directivity function of a single acoustic beam is expressed by b(θ, φ; θ", φ"), which represents beam sensitivity normalized in a (θ", φ") direction of the acoustic beam transmitted in and received from the (θ, φ) direction. To add, performing the two-dimensional continuous scanning with the acoustic beam is equivalent to sounding a three-dimensional space by using a large number of acoustic beams of which transmitting and receiving directions (θ, φ) differ from one another.

Referring to FIG. 4A, the scanning sonar 1 sounds the point target having a reflection factor of 1 located at a point (r', θ', φ') by using a pulselength τ and plots normalized received sound intensity time series data $P^2(r, \theta, \phi)$ obtained by the acoustic beam oriented in the (θ, φ) direction at a point (r, θ, φ) to produce a three-dimensional image. Consequently, the acoustic beam has a spreading range corresponding to its beam width and pulselength as depicted in FIG. 4B. This spreading range is referred to as the point spread function which is expressed by h(r', θ', φ'; r, θ, φ)). Here, the normalized received sound intensity is a quantity obtained by converting a received sound intensity signal into target strength by correcting the received sound intensity signal with time-varied gain (TVG) and transmitting sound pressure (or by multiplying the received sound intensity signal by $r^4 P_O^{-2} (e^{2\alpha r})^2$). The normalized received sound intensity may also be regarded as a three-dimensional response from the point target normalized to a maximum value of 1.

The point spread function h(r', θ', φ'; r, θ, φ) can be expressed by equation (3) below by using the transmit-receive product directivity function b(θ, φ; θ", φ") and a transmit signal envelope function R(r) which is given by equation (4) below:

$$h(r', \theta', \phi'; r, \theta, \phi) = R(r - r') \cdot b(\theta, \phi; \theta', \phi') \quad (3)$$

$$R(r) = 1 \quad |r| \leq c\tau/4 \quad (4)$$
$$\quad\quad = 0 \quad |r| > c\tau/4$$

The above equations indicate that the point target existing at the point (r', θ', φ') spreads as much as the pulselength in the range r direction and as much as b(θ, φ; θ', φ') in the directions of r and imaginary vertical planes.

A volume integral of the point spread function is $c\tau/2 \times r^2 \times \psi$, where ψ is referred to as the equivalent beam width which is defined by a quadratic function of b(θ, φ; θ", φ"). The value of a volume integral of a point spread function obtained when using a cylindrical coordinate system may be expected to become the same value.

Then, the multibeam sonar successively acquires and integrates equivalent input sound intensities $P_M^2$ derived from individual volume elements along the r, θ and x directions. Multiplying equation (2) by the time-varied gain (TVG) and volume element rdrdθdx and integrating the result along the r, θ and x directions, we obtain equation (5) below. Equation (2) is multiplied by TVG for compensating for spreading loss and absorption loss of acoustic waves. This is because the acoustic waves attenuate in proportion to the square of the distance from the transducer 2 to the fish school FS and due to viscosity of sea water.

$$\int P_M^2(r, \theta, z) \cdot r^2 \cdot (e^{2\alpha r})^2 \cdot r \cdot dr d\theta dx \quad (5)$$

$$= \int Ts \cdot \frac{P_0^2}{r^4} (e^{-2\alpha r})^2 \cdot \int n(r', \theta', x') \cdot h(r', \theta', x'; r, \theta, x) \cdot$$
$$r' \cdot dr' d\theta' dx' \cdot r^3 \cdot (e^{2\alpha r})^2 \cdot dr d\theta dx$$

$$= Ts \cdot P_0^2 \cdot \int n(r', \theta', x') \cdot \left\{ \int \frac{h(r', \theta', x'; r, \theta, x)}{r} \cdot dr d\theta dx \right\} \cdot$$
$$r' \cdot dr' d\theta' dx'$$

Here, the integration in brackets { } in equation (5) can be developed as shown by equation (6) below:

$$\int \frac{h(r', \theta', x', r, \theta, x)}{r} \cdot dr d\theta dx \quad (6)$$

$$= \int \frac{h(r', \theta', x', r, \theta, x)}{r^2} \cdot r \cdot dr d\theta dx$$

$$= \frac{1}{r'^2} \int h(r', \theta', x', r, \theta, x) \cdot r \cdot dr d\theta dx$$

$$= \frac{1}{r'^2} \cdot \frac{c\tau}{2} \cdot r'^2 \cdot \psi$$

$$= \frac{c\tau}{2} \psi$$

where it is assumed that r is sufficiently larger than cτ/2, c representing the sound velocity, τ representing the pulselength, and ψ representing the equivalent beam width. Substituting equation (6) and equation (1) into equation (5), we obtain equation (7) below:

$$\int P_M^2(r, \theta, x) \cdot r^2 \cdot (e^{2\alpha r})^2 \cdot r \cdot dr d\theta dx \quad (7)$$

$$= Ts \cdot P_0^2 \cdot \int n(r', \theta', x') \cdot \left\{ \int \frac{h(r', \theta', x', r, \theta, x)}{r} \cdot dr d\theta dx \right\} \cdot$$
$$r' \cdot dr' d\theta' dx'$$

$$= Ts \cdot P_0^2 \cdot \int n(r', \theta', x') \cdot \frac{c\tau}{2} \cdot \psi \cdot r' \cdot dr' d\theta' dx'$$

Substituting equation (1)

$$= Ts \cdot P_0^2 \cdot \frac{c\tau}{2} \cdot \psi \cdot N$$

Rewriting equation (7), we obtain equation (8) below:

$$N \cdot Ts = \frac{2}{c\tau} \cdot \frac{1}{P_0^2 \cdot \psi} \int P_M^2(r, \theta, x) \cdot r^3 \cdot (e^{2\alpha r})^2 \cdot dr d\theta dx \quad (8)$$

Derived from signals actually received by the multibeam sonar is data obtained when the ship 7 runs in the x-axis direction while scanning across the yz-plane. Assuming that a beam angle increment in the yz-plane is Δθ, a transmit interval in the x-axis direction is Δx, a beam angle increment in the r direction is Δr, and an output obtained with the acoustic beam from a point of the ith coordinate in the θ direction, the jth coordinate in the x direction and the kth coordinate in the r direction is $P_{Mi,j,k}$, equation (8) shown above can be expressed by equation (9) below:

$$N \cdot Ts = \frac{2}{c\tau} \cdot \frac{\Delta r \Delta \theta \Delta x}{P_0^2 \cdot \psi} \sum_i \sum_j \sum_k P_{M\,i,j,k}^2 \cdot (k\Delta r)^3 \cdot (e^{2\alpha k \Delta r})^2 \quad (9)$$

From equation (9), the product of backscattering strength Ts of a single fish constituting the fish school FS and the number N of fishes in the fish school FS can be calculated based on the principle of fish quantity information calculation using the cylindrical coordinate system. Also, if the backscattering strength Ts of the single fish constituting the fish school FS is determined, the number N of fishes in the fish school FS can be calculated. It is possible to recognize an approximate value of the number N of fishes in the fish school FS in this fashion.

While the principle of fish quantity information calculation has been discussed for a case in which the transducer 2 has a spherical shape in the foregoing, the invention is not limited thereto but is applicable to a case where the transducer 2 has a cylindrical shape. In the latter case, it is necessary to take into consideration the dependence of the transmit signal intensity $P_O^2$ and the equivalent beam width $\psi$ on the angle $\theta$ the r direction makes with the xy-plane. Thus, the latter case can be expressed by substituting equation (10) for equation (2), substituting equation (11) for equation (5), substituting equation (12) for equation (6), substituting equation (13) for equation (7), substituting equation (14) for equation (8), and substituting equation (15) for equation (9), in which the transmit signal intensity is expressed as $P_O^2(\theta)$ and the equivalent beam width is expressed as $\psi(\theta)$. This means that the transmit signal intensity $P_O^2$ and the equivalent beam width $\psi$ depend on the angle $\theta$ of each beam with respect to the xy-plane.

$$P_M^2(r, \theta, x) = Ts \cdot \frac{P_0(\theta)^2}{r^4}(e^{-2\alpha r})^2 \cdot \int n(r', \theta', x') \cdot \quad (10)$$
$$h(r', \theta', x'; r, \theta, x) \cdot r' \cdot dr' d\theta' dx'$$

$$\int \frac{P_M^2(r, \theta, x) \cdot r^2 (e^{2\alpha r})^2 r \cdot dr d\theta dx}{P_0^2(\theta) \cdot \psi(\theta)}$$
$$= \int Ts \cdot r^4 (e^{-2\alpha r})^2 \cdot \int n(r', \theta', x') \cdot$$
$$\frac{h(r', \theta', x'; r, \theta, x)}{\psi(\theta)} \cdot r^3 \cdot (e^{2\alpha r})^2 \cdot dr d\theta dx$$

$$= Ts \cdot P_0(\theta)^2 \cdot \int n(r', \theta', x') \cdot \left\{ \int \frac{h(r', \theta', x'; r, \theta, x) \cdot dr d\theta dx}{r \cdot \psi \cdot (\theta)} \right\} \cdot \quad (11)$$
$$r' \cdot dr' d\theta' dx'$$

$$\int \frac{h(r', \theta', x', r, \theta, x)}{r \cdot \psi(\theta)} \cdot dr d\theta dx \quad (12)$$
$$= \int \frac{h(r', \theta', x', r, \theta, x)}{r^2 \cdot \psi(\theta)} \cdot r \cdot dr d\theta dx$$
$$= \frac{1}{\psi(\theta') \cdot r'^2} \int h(r', \theta', x', r, \theta, x) \cdot r \cdot dr d\theta dx$$
$$= \frac{1}{\psi(\theta') \cdot r'^2} \cdot r'^2 \cdot \frac{c\tau}{2} \psi(\theta') = \frac{c\tau}{2}$$

$$\int \frac{P_M^2(r, \theta, x)}{P_0^2(\theta) \cdot \psi(\theta)} \cdot r^2 \cdot (e^{2\alpha r})^2 \cdot r \cdot dr d\theta dx \quad (13)$$
$$= Ts \cdot \int n(r', \theta', x') \cdot \left\{ \int \frac{h(r', \theta', x', r, \theta, x)}{r \cdot \psi(\theta)} \cdot dr d\theta dx \right\} \cdot$$
$$r' \cdot dr' d\theta' dx'$$
$$= Ts \cdot \int n(r', \theta', x') \cdot \frac{c\tau}{2} \cdot r' \cdot dr' d\theta' dx'$$
(Substituting equation (1))
$$= Ts \cdot \frac{c\tau}{2} \cdot N$$

$$N \cdot Ts = \frac{2}{c\tau} \cdot \int P_M^2(r, \theta, x) \cdot r^3 \cdot (e^{2\alpha r})^2 \cdot \frac{1}{P_0(\theta)^2 \cdot \psi(\theta)} \cdot dr d\theta dx \quad (14)$$

$$N \cdot Ts = \quad (15)$$
$$\frac{2}{c\tau} \cdot \Delta r \Delta \theta \Delta x \sum_i \sum_j \sum_k P_{M\,i,j,k}^2 \cdot (k\Delta r)^3 \cdot (e^{2\alpha k \Delta r})^2 \frac{1}{P_0(\theta)^2 \cdot \psi(\theta)}$$

FIRST EXAMPLE

Figure 5:
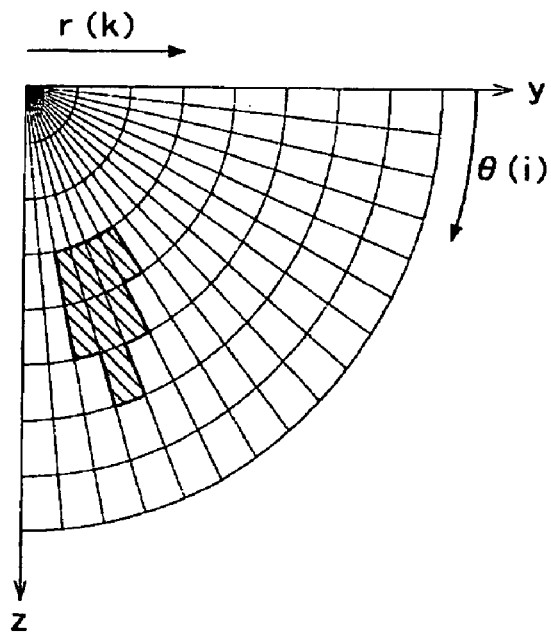
FIG. 5 is a diagram showing data picked up by a receiving beam when the acoustic beam is steered along a yz-plane.
Figure 6:
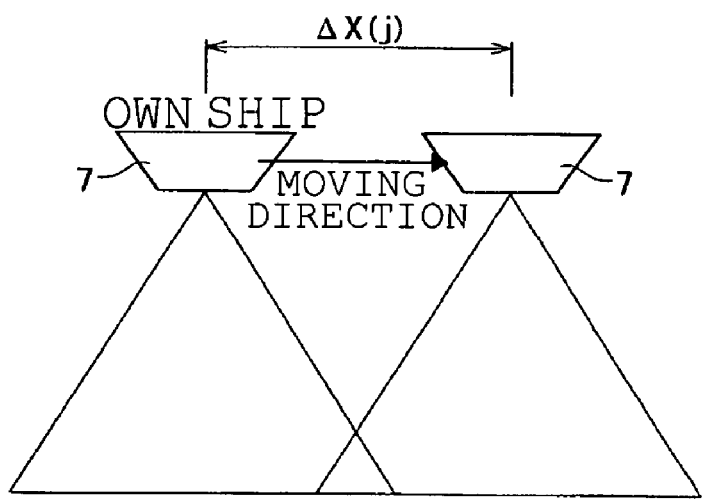
FIG. 6 is a diagram showing a model of how the ship advances.

The First Example is a practical example of a method of calculating fish quantity information using a vertical cylindrical coordinate system. Thus, the principle of fish quantity information calculation using the cylindrical coordinate system can be applied as it is. The First Example based on the principle of fish quantity information calculation using the cylindrical coordinate system is described with reference to FIGS. 2, 5 and 6. FIG. 5 is a diagram showing data picked up by the receiving beam when the acoustic beam is steered along the yz-plane within a range of $0 \leq \theta \leq \pi/2$ (rad). The data shown in FIG. 5 indicates equivalent input sound intensities $P_M^2$ picked up by the receiving beam, so that the larger the equivalent input sound intensity $P_M^2$ picked up by the receiving beam, the higher the density shown in FIG. 5. FIG. 6 is a diagram showing a model of how the ship 7 advances. The transducer 2 has a spherical shape.

Referring to FIG. 2, the ship 7 runs in the positive direction of the x-axis while steering the acoustic sounding beam in the yz-plane. An algorithm used in this Example for calculating the fish quantity information on the fish school FS is explained.

First, a range of measurement of the multibeam sonar 1, or transmit/receive directions of the acoustic beam, is set, in which the transmit/receive directions are expressed in terms of r(k), θ(i), x(j). Here, the range of measurement in the r direction is $0 \leq r \leq$ (detectable range of the acoustic beam) (m), the range of measurement in the θ direction is $0 \leq \theta \leq \pi/2$ (rad), and the range of measurement in the range x direction is $0 \leq x \leq$ (distance traveled by the ship 7) (m).

When the acoustic beam transmitted along the yz-plane is reflected from inside the fish school FS and a resultant echo is received by the receiving beam, the equivalent input sound intensities $P_M^2$ picked up by the receiving beam are displayed on the display section 6 in the form of data painted in darker and lighter shades as shown in FIG. 5.

Next, the equivalent input sound intensities $P_M^2$ picked up by the receiving beam are subjected to two-dimensional echo integration. Since the transducer 2 has a spherical shape, the value of two-dimensional echo integration $S_j$ along the yz-plane is expressed by equation (16) below:

$$S_j = \sum_i \sum_k P_{M\,i,j,k}^2 \cdot (k\Delta r)^3 \cdot (e^{2\alpha k \Delta r})^2 \quad (i = 1, \ldots)(k = 1, \ldots) \quad (16)$$

where $P_{M\,i,j,k}^2$ represents the equivalent input sound intensities for individual volume elements (r, θ, x) and $P_O^2$ represents the transmit signal intensity.

The transmit interval of the transmitting beam (receive interval of the receiving beam) is calculated along the moving direction of the ship 7, where the transmit interval of the transmitting beam is distance $\Delta x(j)$ shown in FIG. 6 which is expressed by equation (17) below:

$$\Delta x_j = 1852 \cdot \sqrt{\begin{array}{l}(\text{Lat}_j - \text{Lat}_{j-1})^2 + \\ ((\text{Long}_j - \text{Long}_{j-1}) \cdot \\ \cos(\text{Lat}_j))^2\end{array}} \quad (j = 1, \ldots) \quad (17)$$

where a coefficient "1852" in equation (17) is a unit conversion factor used for conversion from miles (n.m.) to meters. Also, "$\text{Lat}_j$" represents latitude (minutes) of the ship at each j value and "$\text{Lon}_j$" represents longitude (minutes) of the ship at each j value.

Then, values of two-dimensional echo integration $S_j$ obtained on the yz-plane are volumetrically integrated along the moving direction of the ship. Applying equation (9), we obtain equation (18) below:

$$N \cdot Ts = \frac{2}{c\tau} \cdot \frac{\Delta r \cdot \Delta \theta}{P_0^2 \cdot \psi} \cdot \sum_j \Delta x_j \cdot S_j \quad (j=1, \ldots) \qquad (18)$$

Thus, if Ts of a fish body is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the angle θ of the acoustic beam with respect to the xy-plane within the range of $0 \leq \theta \leq \pi/2$ (rad) in the present Example, the range of the angle θ is not limited thereto but the angle θ may be made variable over a desired range if this range is within $0 \leq \theta \leq \pi$ (rad). However, if the transducer 2 has a cylindrical shape, the acoustic beam can not be transmitted or received in a direction of $\theta=\pi/2$ (rad), so that the angle θ is to be arbitrarily varied within ranges of $0 \leq \theta < \pi/2$ (rad) and $\pi < \theta \leq \pi$ (rad) in this case.

Also, while the fish quantity information about the fish school FS is calculated on the assumption that the multibeam sonar transmits and receives the acoustic beam while varying the angle θ of the acoustic beam with respect to the xy-plane in the present Example, the invention is not limited thereto. For example, the fish quantity information may be calculated on the assumption that the multibeam sonar varies the angle with respect to the xz-plane (i.e., the angle with the z-axis in the yz-plane).

Also, while the sonar apparatus of the present Example is the scanning sonar 1, the invention is not limited thereto. The sonar apparatus of the present invention may be a bottom sounding sonar which can successively scan a wide area in directions along the yz-plane (i.e., both left and right directions from a point vertically beneath the ship 7). An apparatus disclosed in Japanese Patent Application Publication No. 2001-99914 is an example of the bottom sounding sonar. When the sonar apparatus of the present invention is used as a bottom sounding sonar, the range of the angle θ of each beam with respect to the y-axis in the yz-plane is not fixed. It is possible to set the angle θ within a range of π/4 (rad) on both sides of the z-axis (π/2 (rad)) or π/3 (rad) on both sides of the z-axis (2π/3 (rad)), for example. In this case, a plane one-dimensional transducer array (in which strip transducers are arrayed) or a curved one-dimensional transducer array (in which a plane one-dimensional transducer array is curved in a transducer array direction), for instance, is used as a transducer.

Also, while the foregoing discussion of the present Example has illustrated a case where the transducer 2 has a spherical shape, the transducer 2 is not limited thereto but may have a cylindrical shape. The latter case can be expressed by substituting equation (19) for equation (16), and substituting equation (20) for equation (18), in which the transmit signal intensity is expressed as $P_O^2(\theta)$ and the equivalent beam width is expressed as $\psi(\theta)$.

$$S_j = \sum_i \sum_k P_{M,i,j,k}^2 \cdot (k \Delta r)^3 \cdot (e^{2 \alpha k \Delta r})^2 \cdot \frac{1}{P_0(\theta)^2 \cdot \psi(\theta)} \qquad (19)$$

$(i=1, \ldots)(k=1, \ldots)$ $$N \cdot Ts = \frac{2}{c\tau} \cdot \Delta r \cdot \Delta \theta \cdot \sum_j \Delta x_j \cdot S_j (j=1, \ldots) \qquad (20)$$

SECOND EXAMPLE

The Second Example is a practical example of a method of calculating fish quantity information using an inclined axis cylindrical coordinate system. Thus, the principle of fish quantity information calculation using the cylindrical coordinate system can not be directly applied as it is but needs to be modified. Here, it is assumed that the transducer 2 has a spherical shape. The principle of fish quantity information calculation using the cylindrical coordinate system of the Second Example is now described with reference to FIGS. 7 to 11.

Figure 7:
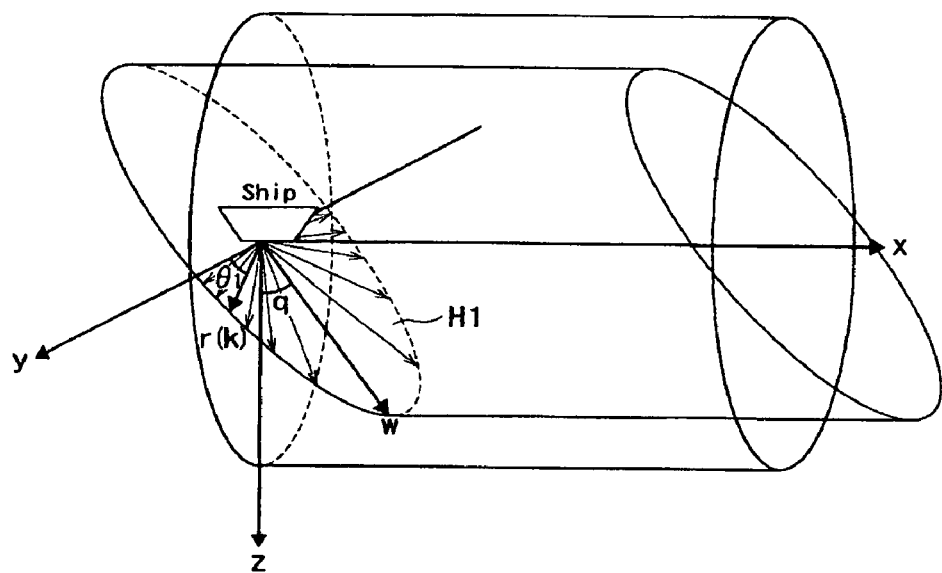
FIG. 7 is a diagram showing a model of an inclined axis cylindrical coordinate system.

FIG. 7 is a diagram showing a model of the inclined axis cylindrical coordinate system. As illustrated in FIG. 7, the ship 7 is moving in the positive direction of the x-axis while steering the acoustic beam along a slant plane H1. An algorithm used for calculating the fish quantity information using the inclined axis cylindrical coordinate system is explained in the following. The "slant plane H1" is an imaginary plane containing the y-axis and a w-axis (downward-pointing axis) which exists in the xz-plane, the w-axis being inclined toward the positive direction of the x-axis to intersect the z-axis at a specific angle q.

The scanning sonar emits the acoustic sounding beam in the depth direction into the body of sea water while varying angle $\theta_1$ of the acoustic sounding beam in the slantplane H1 with respect to the y-axis, where the angle q is set within a range of $-\pi/2 \leq q \leq \pi/2$ (rad) and the angle $\theta_1$ is an angle which varies within a range of $0 \leq \theta_1 \leq \pi$ (rad).

Figure 8:
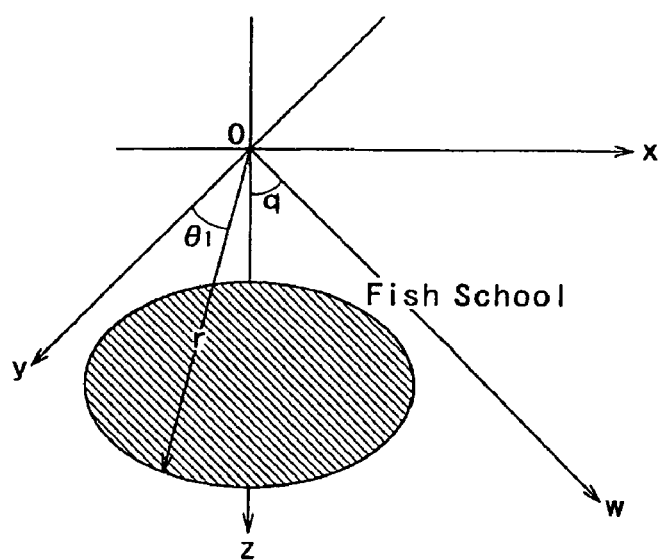
FIG. 8 is a diagram showing a positional relationship between a transducer and a fish school.

Referring to FIG. 8, if the density of a fish school FS is n(r, $\theta_1$, x), the total number N of fishes in the fish school can be expressed by equation (21) below, where FIG. 8 is a diagram showing a positional relationship between the transducer 2 (origin O) and the fish school FS:

$$N = \cos q \int n(r, \theta_1, x) \cdot r \cdot dr d\theta_1 dx \qquad (21)$$

When a transmitting beam emitted in a direction of (r, $\theta_1$, x) from the transducer 2 is reflected by the fish school FS and the transducer 2 receives the echo thus reflected by the receiving beam, equivalent input sound intensity $P_M^2$ obtained from the received echo is processed by the signal processing section 5. A sequence of operations performed on the equivalent input sound intensity $P_M^2$ by the signal processing section 5 is explained below.

Given the beam angle $\theta_1$ with respect to the y-axis in the slant plane H1, range r in the r direction and range x in the x-axis direction, the equivalent input sound intensity $P_M^2$(r, $\theta_1$, x) can be expressed by equation (22) below where $P_O^2$ is the transmit signal intensity, α is the absorption loss coefficient, and h is the spread function:

$$P_M^2(r, \theta_1, x) = Ts \cdot \frac{P_0^2}{r^4} (e^{-2\alpha r})^2 \cdot \cos q \qquad (22)$$

$$\int n(r', \theta_1', x') \cdot h(r', \theta_1', x'; r, \theta_1, x) \cdot r' \cdot dr' \cdot d\theta_1' dx'$$

Then, the multibeam sonar successively acquires and integrates equivalent input sound intensities $P_M^2$ derived from individual volume elements along the r, $\theta_1$ and x directions. Multiplying equation (22) by the time-varied gain (TVG) and volume element, we obtain equation (23) below:

$$\cos q \int P_M^2(r, \theta_1, x) \cdot r^2 \cdot (e^{2\alpha r})^2 \cdot r \cdot dr d\theta_1 dx = \qquad (23)$$

$$\cos q \cdot \cos q \int Ts \cdot \frac{P_0^2}{r^4}(e^{-2\alpha r})^2 \cdot \int n(r', \theta_1', x') \cdot h(r', \theta_1', x'; r, \theta_1, x) \cdot$$

$$r' \cdot dr' d\theta_1' dx' \cdot r^3 \cdot (e^{2\alpha r})^2 \cdot dr d\theta_1 dx = \cos q \cdot Ts \cdot P_0^2 \cdot$$

$$\int n(r', \theta_1', x') \cdot \left\{ \int \frac{h(r', \theta_1', x'; r, \theta_1, x)}{r} \cos q \cdot dr d\theta_1 dx \right\} \cdot r' \cdot dr' d\theta_1' dx'$$

Here, the integration in brackets { } in equation (23) can be developed as shown by equation (24) below:

$$\int \frac{h(r', \theta_1', x'; r, \theta_1, x)}{r} \cdot \cos q \cdot dr d\theta_1 dx = \cos q \int \frac{h(r', \theta_1', x'; r, \theta_1, x)}{r^2} \cdot r \cdot dr d\theta_1 dx \qquad (24)$$

$$= \frac{\cos q}{r'^2} \int h(r', \theta_1', x'; r, \theta_1, x) \cdot r \cdot dr d\theta_1 dx$$

$$= \frac{\cos q}{r'^2} \int h(r', \theta_1', x'; r, \theta_1, x) \cdot r \cdot dr d\theta_1 dx$$

$$= \frac{c\tau}{2} \cdot \psi$$

where it is assumed that r is sufficiently larger than $c\tau/2$, c representing the sound velocity, $\tau$ representing the pulse-length, and $\psi$ representing the equivalent beam width. Substituting equation (24) and equation (21) into equation (23), we obtain equation (25) below:

$$\int P_m^2(r, \theta_1, x) \cdot r^2 \cdot (e^{2\alpha r})^2 \cdot r \cdot \cos q \cdot dr d\theta_1 dx = Ts \cdot P_0^2 \cdot \qquad (25)$$

$$(\cos q) \int n(r', \theta_1', x') \cdot$$

$$\left\{ \int \frac{h(r', \theta_1', x'; r, \theta_1, x)}{r} \cdot \cos q \cdot dr d\theta_1 dx \right\} \cdot r' \cdot dr' d\theta_1' dx' =$$

$$Ts \cdot P_0^2 \cdot (\cos q) \int n(r', \theta_1', x') \cdot \frac{c\tau}{2} \cdot \psi \cdot r' \cdot dr' d\theta_1' dx'$$

(Substituting equation (1)) $= Ts \cdot P_0^2 \cdot \frac{c\tau}{2} \cdot \psi \cdot N$ Rewriting equation (25), we obtain equation (26) below:

$$N \cdot Ts = \frac{2}{c\tau} \cdot \frac{1}{P_0^2 \cdot \psi} \int P_M^2(r, \theta_1, x) \cdot r^3 \cdot (e^{2\alpha r})^2 \cdot \cos q dr d\theta_1 dx \qquad (26)$$

Derived from signals actually received by the multibeam sonar is data obtained when the ship 7 runs in the positive direction of the x-axis direction while scanning across the slant plane H1. Assuming that a beam angle increment in the slant plane H1 is $\Delta\theta_1$, the transmit interval in the x-axis direction is $\Delta x$, a beam angle increment in the r direction is $\Delta r$, and an output obtained with the acoustic beam from a point of the ith coordinate in the $\theta_1$ direction, the jth coordinate in the x direction and the kth coordinate in the r direction is $P_{Mi,j,k}$, equation (26) shown above can be expressed by equation (27) below:

$$N \cdot Ts = \cos q \cdot \frac{2}{c\tau} \cdot \frac{\Delta r \Delta \theta_1}{P_0^2 \cdot \psi} \sum_i \sum_j \sum_k P_{Mi,j,k}^2 \cdot (k\Delta r)^3 \cdot (e^{2\alpha k \Delta r})^2 \Delta x_j \qquad (27)$$

The principle of fish quantity information calculation using the inclined axis cylindrical coordinate system is an adapted form of the aforementioned principle of fish quantity information calculation using the cylindrical coordinate system as discussed above.

In the Second Example, a range of measurement of the multibeam sonar 1, or transmit/receive directions of the acoustic beam, is set at first, in which the transmit/receive directions are expressed in terms of r(k), $\theta_1$(i), x(j). Here, the range of measurement in the $\theta_1$ direction is $0 \leq \theta_1 \leq \pi$ (rad), the range of measurement in the range x direction is $0 \leq x \leq$ (distance traveled by the ship 7) (m), and the range of measurement in the r direction is $0 \leq r \leq$ (detectable range of the acoustic beam) (m).

Figure 9:
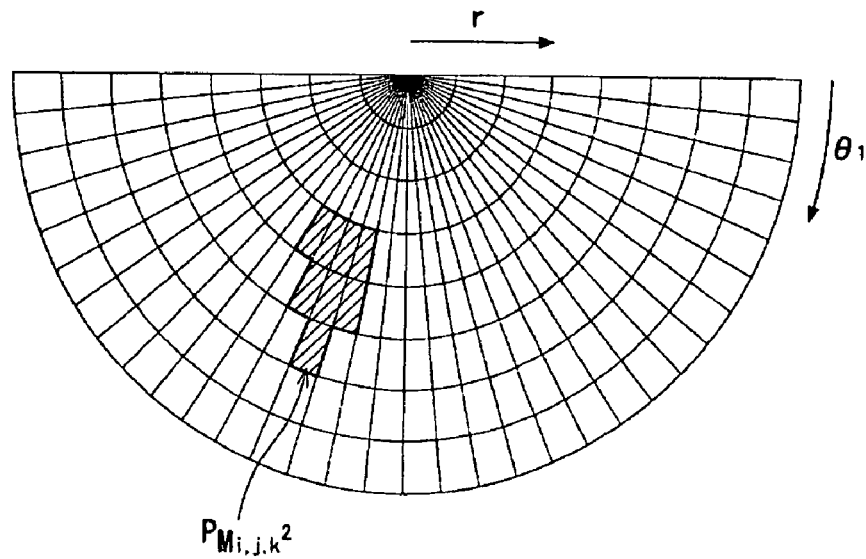
FIG. 9 is a diagram showing data picked up by the receiving beam when the acoustic beam is steered along an imaginary slant plane H1.

Here, when the acoustic beam transmitted along the imaginary slant plane H1 is reflected from the fish school FS and a resultant echo is received by the receiving beam, the equivalent input sound intensities $P_M^2$ picked up by the receiving beam are displayed on the display section 6 in the form of data painted in darker and lighter shades as shown in FIG. 9. FIG. 9 is a diagram showing data picked up by the receiving beam when the acoustic beam is steered along the slant plane H1 within the range of $0 \leq \theta_1 \leq \pi$ (rad).

Next, the equivalent-input sound intensities $P_M^2$ picked up by the receiving beam with the acoustic beam emitted along the imaginary slant plane H1 are subjected to two-dimensional echo integration. Since the transducer 2 has a spherical shape, the value of two-dimensional echo integration $S_j$ along the slant plane H1 is expressed by equation (28) below:

$$S_j = \sum_i \sum_k P_{Mi,j,k}^2 \cdot (k\Delta r)^3 \cdot (e^{2\alpha k \Delta r})^2 \quad (i = 1, \ldots )(k = 1, \ldots ) \qquad (28)$$

where $P_{Mi,j,k}^2$ represents the equivalent input sound intensities for individual volume elements (r, $\theta_1$, x) and $P_O^2$ represents the transmit signal intensity as in the First Example.

Figure 10:
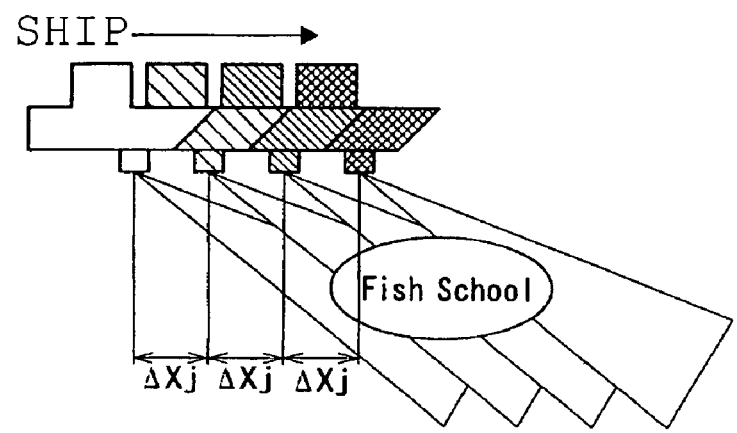
FIG. 10 is a diagram showing a model of how the ship advances.
Figure 11:
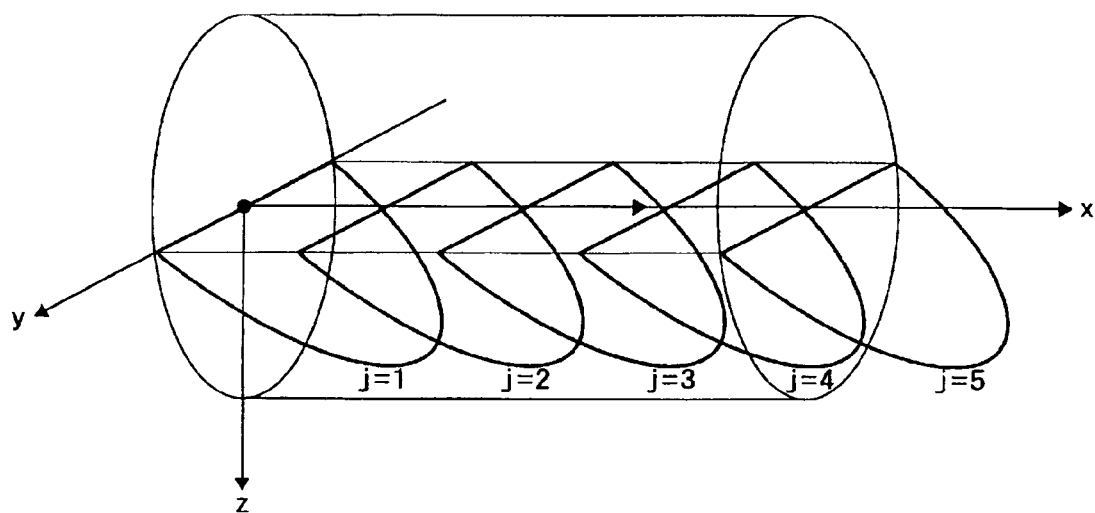
FIG. 11 is a conceptual illustration used for explaining a formula for calculating the number of fishes in a fish school.

Next, transmit/receive intervals of the acoustic beam are calculated. Here, the transmit/receive interval $\Delta x_j$ of the acoustic beam from the ship 7 represents each distance shown in FIG. 10, or the interval between successive j values shown in FIG. 11, which is expressed by equation (29) below. FIG. 9 shows equivalent input sound intensities $P_M^2$ picked up by the receiving beam, so that the larger the equivalent input sound intensity $P_M^2$ picked up by the receiving beam, the higher the density shown in FIG. 9. FIG. 10 is a diagram showing a model of how the ship 7 advances, and FIG. 11 is a conceptual illustration used for explaining a formula for calculating the number of fishes in a fish school.

$$\Delta x_j = \cos q \cdot 1852 \cdot \sqrt{\frac{(Lat_j - Lat_{j-1})^2 +}{((Long_j - Long_{j-1}) \cdot \cos(Lat_j))^2}} \quad (29)$$

$$(j = 1, \ldots)$$

As explained with reference to the First Example, a coefficient "1852" in equation (29) is a unit conversion factor used for conversion from miles (n.m.) to meters. Also, "$Lat_j$" represents latitude (minutes) of the ship at each j value and "$Lon_j$" represents longitude (minutes) of the ship at each j value.

Then, values of two-dimensional echo integration $S_j$ obtained on the slant plane H1 are volumetrically integrated along the moving direction of the ship. Applying equation (27), we obtain equation (30) below:

$$N \cdot Ts = \frac{2}{c\tau} \cdot \frac{\Delta \theta_1 \cdot \Delta r}{P_0^2 \cdot \psi} \cdot \sum_j \Delta x_j \cdot S_j \quad (J = 1, \ldots) \quad (30)$$

Thus, if Ts of a fish body is determined, it is possible to calculate the approximate number N of fishes within the fish school FS. The approximate number N of fishes within the fish school FS thus calculated is displayed on the display section 6 as explained in the first principle.

Although the multibeam sonar transmits and receives the acoustic beam while varying the angle $\theta_1$ of the acoustic beam with respect to the y-axis in the slant plane H1 within the range of $0 \leq \theta_1 \leq \pi$ (rad) in the present Example, the range of the angle $\theta_1$ is not limited thereto but the angle $\theta_1$ may be variable within a range of $0 \leq \theta_1 \leq \pi/2$ (rad). This means that the angle $\theta_1$ may be made variable over a desired range if this range is within $0 \leq \theta_1 \leq \pi$ (rad).

Also, while the fish quantity information about the fish school FS is calculated on the assumption that the multibeam sonar transmits and receives the acoustic beam while varying the angle $\theta_1$ of the acoustic beam with respect to the y-axis in the slant plane H1 in the present Example, the invention is not limited thereto. For example, the fish quantity information may be calculated on the assumption that the multibeam sonar varies the angle with respect to the w-axis in the slant plane H1.

Also, while the foregoing discussion of the present Example has illustrated a case where the transducer 2 has a spherical shape, the transducer 2 is not limited thereto but may have a cylindrical shape. The latter case can be expressed by substituting equation (31) for equation (22), substituting equation (32) for equation (23), substituting equation (33) for equation (22), substituting equation (31) for equation (24), substituting equation (34) for equation (25), substituting equation (35) for equation (26), substituting equation (36) for equation (27), and substituting equation (38) for equation (30), in which the transmit signal intensity is expressed as $P_O^2(\theta)$ and the equivalent beam width is expressed as $\psi(\theta)$.

This means that the transmit signal intensity $P_O^2$ and the equivalent beam width $\psi$ depend on the angle $\theta$ of each beam with respect to the xy-plane.

$$P_M^2(r, \theta_1, x) = \cos q \int n(r', \theta_1', x') \cdot \frac{T s \cdot \frac{P_0(\theta)^2}{r^4}(e^{-2\alpha r})^2 \cdot}{h(r', \theta_1', x'; r, \theta_1, x) \cdot r' \cdot dr' d\theta_1' dx'} \quad (31)$$

$$\cos q \int \frac{P_M^2(r, \theta_1, x)}{P_0^2(\theta) \cdot \psi(\theta)} \cdot \quad (32)$$
$$r^2(e^{2\alpha r})^2 \cdot r \cdot dr d\theta_1 d x = \cos q \cdot \cos q \int Ts \cdot \frac{1}{r^4}(e^{-2\alpha r})^2 \cdot$$
$$\int n(r', \theta_1', x') \cdot \frac{h(r', \theta_1', x'; r, \theta_1, x)}{\psi(\theta)} \cdot$$
$$r' \cdot dr' d\theta_1' dx' \cdot r^3 \cdot (e^{2\alpha r})^2 \cdot dr d\theta_1 dx$$
$$= \cos q \cdot Ts \cdot \int n(r', \theta_1', x') \cdot$$
$$\left\{ \int \frac{h(r', \theta_1', x'; r, \theta_1, x)}{r \cdot \psi(\theta)} \cos q \cdot dr d\theta_1 dx \right\} \cdot$$
$$r' \cdot dr' d\theta_1' dx'$$

$$\int \frac{h(r', \theta_1', x'; r, \theta_1, x)}{r \cdot \psi(\theta)} \cdot \quad (33)$$
$$\cos q \cdot dr d\theta_1 dx = \cos q \int \frac{h(r', \theta_1', x'; r, \theta_1, x)}{r^2 \cdot \psi(\theta)} \cdot r \cdot dr d\theta_1 dx$$
$$= \frac{\cos q}{r'^2} \int \frac{h(r', \theta_1', x'; r, \theta_1, x)}{\psi(\theta)} \cdot r \cdot dr d\theta_1 dx$$
$$\frac{\cos q}{r'^2} \int h(r', \theta_1', x'; r, \theta_1, x) \cdot r \cdot dr d\theta_1 dx$$
$$= \frac{c\tau}{2}$$

$$\int \frac{P_M^2(r, \theta_1, x) \cdot r^2}{P_0^2(\theta) \cdot \psi(\theta)} \cdot \quad (34)$$
$$(e^{2\alpha r})^2 \cdot r \cdot \cos q \cdot = Ts \cdot (\cos q) \int n(r', \theta_1', x') \cdot$$
$$dr d\theta_1 d x$$
$$\left\{ \int \frac{h(r', \theta_1', x'; r, \theta_1, x)}{r \cdot \psi(\theta)} \cos q \cdot dr d\theta_1 dx \right\} \cdot$$
$$r' \cdot dr' d\theta_1' dx'$$
$$= Ts \cdot (\cos q) \int n(r', \theta_1', x') \cdot \frac{c\tau}{2} \cdot r' \cdot$$
$$dr' d\theta_1' dx'$$
(Substituting equation (1))
$$= Ts \cdot \frac{c\tau}{2} \cdot N$$

$$N \cdot Ts = \frac{2}{c\tau} \cdot \int P_M^2(r, \theta_1, x) \cdot r^3 \cdot (e^{2\alpha r})^2 \cdot \frac{1}{P_0(\theta)^2 \cdot \psi(\theta)} \cdot \cos q dr d\theta_1 dx \quad (35)$$

$$N \cdot Ts = \frac{\cos q \cdot \frac{2}{c\tau} \cdot \Delta r \Delta \theta_1 \Delta x \sum_j \sum_i \sum_k P_{M\,i,j,k}^2 \cdot}{(k\Delta r)^3 \cdot (e^{2\alpha k \Delta r})^2 \frac{1}{P_0(\theta)^2 \cdot \psi(\theta)}} \quad (36)$$

$$S_j = \sum_i \sum_k P_{M\,i,j,k}^2 \cdot (k\Delta r)^3 \cdot (e^{2\alpha k \Delta r})^2 \frac{1}{P_0(\theta)^2 \cdot \psi(\theta)} \quad (37)$$

$$N \cdot Ts = \frac{2}{c\tau} \cdot \Delta \theta_1 \cdot \Delta r \cdot \sum_j \Delta x_j \cdot S_j \quad (38)$$

THIRD EXAMPLE

The Third Example is a practical example of a method of calculating fish quantity information using an oblique axis cylindrical coordinate system. In this Example, it is possible to apply the aforementioned principle of fish quantity information calculation using the cylindrical coordinate system as in the Second Example. Here, it is assumed that the transducer 2 has a spherical shape. The principle of fish quantity information calculation using the cylindrical coordinate system of the Third Example is now described with reference to FIGS. 12 and 13.

Figure 12:
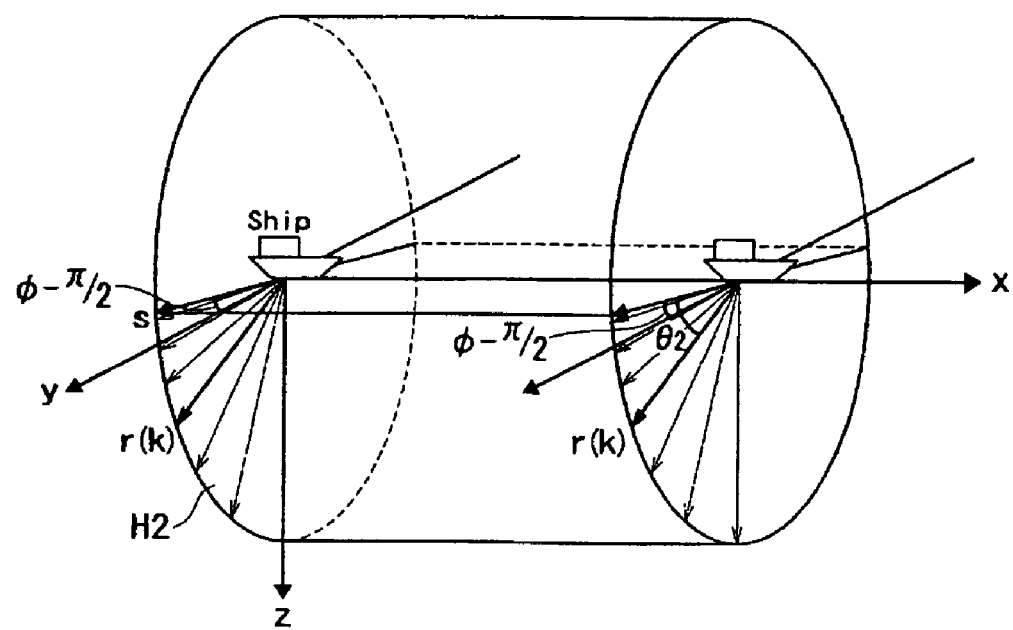
FIG. 12 is a diagram showing a model of a oblique axis cylindrical coordinate system.
Figure 13:
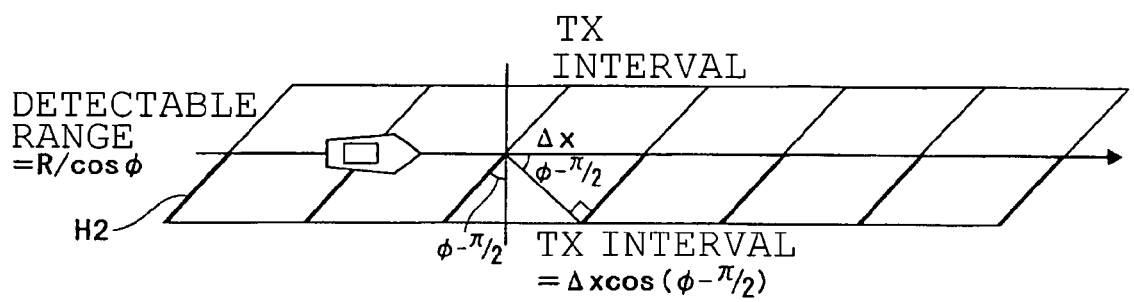
FIG. 13 is a plan view showing a model of how the ship shown in FIG. 12 advances.

FIG. 12 is a diagram showing a model of the oblique axis cylindrical coordinate system, and FIG. 13 is a plan view showing a model of how the ship shown in FIG. 12 advances. As illustrated in FIG. 12, the ship 7 is moving in the positive direction of the x-axis while steering the acoustic beam along a twisted vertical plane H2. An algorithm used for calculating the fish quantity information in this case is explained below. The "twisted vertical plane H2" is an imaginary plane containing an imaginary s-axis which intersects the x-axis at a specific angle $\phi$ as measured clockwise in a horizontal direction and the z-axis. This means that the s-axis is an imaginary axis in the xy-plane that intersects the y-axis at an angle of $(\phi-\pi/2)$ (rad) as measured clockwise in the horizontal direction.

The scanning sonar emits the acoustic sounding beam in the depth direction into the body of sea water while varying angle $\theta_2$ of the acoustic sounding beam in the twisted vertical plane H2 with respect to the s-axis, where the angle $\theta_2$ is an angle which varies within a range of $0 \leq \theta_2 \leq \pi$ (rad).

If equivalent input sound intensities $P_M^2$ picked up by the receiving beam are obtained by steering the acoustic beam along the twisted vertical plane H2, it is possible to apply the aforementioned principle of fish quantity information calculation using the cylindrical coordinate system. The algorithm used for calculating the fish quantity information using the oblique axis cylindrical coordinate system is explained in the following.

First, a range of measurement of the multibeam sonar 1, or transmit/receive directions of the acoustic beam, is set, in which the transmit/receive directions are expressed in terms of r(k), $\theta_2$(i), x(j). Here, the range of measurement in the r direction is $0 \leq r \leq$ (detectable range of the acoustic beam) (m), the range of measurement in the $\theta_2$ direction is $0 \leq \theta_2 \leq \pi$ (rad), and the range of measurement in the range x direction is $0 \leq x \leq$ (distance traveled by the ship 7) (m).

Here, when the acoustic beam transmitted along the twisted vertical plane H2 is reflected from inside the fish school FS and a resultant echo is received by the receiving beam, the equivalent input sound intensities $P_M^2$ picked up by the receiving beam are displayed on the display section 6 in the form of data painted in darker and lighter shades as shown in FIG. 5 in the First Example or as shown in FIG. 9 in the Second Example (not illustrated in the present Example).

Next, the equivalent input sound intensities $P_M^2$ picked up by the receiving beam with the acoustic beam emitted along the imaginary twisted vertical plane H2 are subjected to two-dimensional echo integration. Since the transducer 2 has a spherical shape, the value of two-dimensional echo integration $S_j$ along the twisted vertical plane H2 is expressed by equation (39) below:

$$S_j = \sum_i \sum_k P_{M,i,j,k}^2 \cdot (k\Delta r)^3 \cdot (e^{2\alpha k \Delta r})^2 \qquad (39)$$

$$(i=1,\ldots)(k=1,\ldots)$$

where $P_{M,i,j,k}^2$ represents the equivalent input sound intensities for individual volume elements (r, $\theta_2$, x) and $P_O^2$ represents the transmit signal intensity as in the First Example and the Second Example.

Next, transmit/receive intervals of the acoustic beam are calculated. The transmit/receive interval $\Delta x_j$ of the acoustic beam from the ship 7 is given by $\Delta x_j = \Delta x \cos(\phi-\pi/2)$ (refer to FIG. 13), where $\Delta x$ is expressed by $\Delta x = v \times \Delta t$ given the ship speed v and transmit time interval $\Delta t$ of the acoustic beam.

There exist a plurality of methods of calculating $\Delta x_j$. For example, it is possible to calculate a transmission-to-transmission distance at each j value along the x direction from latitude and longitude values as shown by equation (40) below:

$$\Delta x_j = 1852 \cdot \sqrt{(\text{Lat}_j - \text{Lat}_{j-1})^2 + ((\text{Long}_j - \text{Long}_{j-1}) \cdot \cos(\text{Lat}_j))^2} \qquad (40)$$

where a coefficient "1852" in equation (40) is a unit conversion factor used for conversion from miles (n.m.) to meters, "Lat$_j$" represents latitude (minutes) of the ship at each j value and "Lon$_j$" represents longitude (minutes) of the ship at each j value.

Then, values of two-dimensional echo integration $S_j$ obtained on the twisted vertical plane H2 are volumetrically integrated along the moving direction of the ship. Applying equation (9), we obtain equation (41) below:

$$N \cdot Ts = \frac{2}{c\tau} \cdot \frac{\Delta\theta_2 \cdot \Delta r}{P_0^2 \cdot \psi} \cdot \cos(\phi - \frac{\pi}{2}) \cdot \sum_j S_j \cdot \Delta x_j \qquad (41)$$

$$(j=1,\ldots)$$

Thus, if Ts of a fish body is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the angle $\theta_2$ of the acoustic beam with respect to the s-axis in the twisted vertical plane H2 within the range of $0 \leq \theta_2 \leq \pi$ (rad) in the present Example, the range of the angle $\theta$ is not limited thereto but the angle $\theta_2$ may be made variable over a desired range if this range is within $0 \leq \theta_2 \leq \pi$ (rad).

Also, while the fish quantity information about the fish school FS is calculated on the assumption that the multibeam sonar transmits and receives the acoustic beam while varying the angle $\theta_2$ of the acoustic beam with respect to the s-axis in the twisted vertical plane H2 in the present Example, the invention is not limited thereto. For example, the fish quantity information may be calculated on the assumption that the multibeam sonar varies the angle with respect to the z-axis in the twisted vertical plane H2.

Also, the present Example is not limited to an arrangement in which the s-axis intersects the y-axis in a clockwise direction but may employ an arrangement in which the s-axis intersects the y-axis in a counterclockwise direction. In the latter case, the angle $(\phi-\pi/2)$ (rad) of the s-axis with respect to the y-axis measured counterclockwise is negative, or $(\phi-\pi/2) < 0$.

Also, while the foregoing discussion of the present Example has illustrated a case where the transducer 2 has a spherical shape, the transducer 2 is not limited thereto but may have a cylindrical shape. The latter case can be expressed by substituting equation (42) for equation (39), and substituting equation (43) for equation (41), in which the transmit signal intensity is expressed as $P_O^2(\theta)$ and the equivalent beam width is expressed as $\psi(\theta)$. This means that the transmit signal intensity $P_O^2$ and the equivalent beam width $\psi$ depend on the angle $\theta$ of each beam with respect to the xy-plane.

$$S_j = \sum_i \sum_k P_{M,i,j,k}^2 \cdot (k\Delta r)^3 \cdot (e^{2\alpha k \Delta r})^2 \quad (42)$$

$(i = 1, \ldots)(k = 1, \ldots)$ $$N \cdot Ts = \frac{2}{c\tau} \cdot \Delta\theta_2 \cdot \Delta r \cdot \cos\left(\phi - \frac{\pi}{2}\right) \sum_j S_j \cdot \frac{1}{P_0(\theta)^2 \cdot \psi(\theta)} \cdot \Delta x_j \quad (43)$$

FOURTH EXAMPLE

The Fourth Example is a practical example of a method of calculating fish quantity information using an inclined oblique axis cylindrical coordinate system. In this Example, it is possible to apply the aforementioned principle of fish quantity information calculation using the cylindrical coordinate system as in the Second and Third Examples. Here, it is assumed that the transducer 2 has a spherical shape. The principle of fish quantity information calculation using the cylindrical coordinate system of the Fourth Example is now described with reference to FIGS. 14 and 15.

Figure 14:
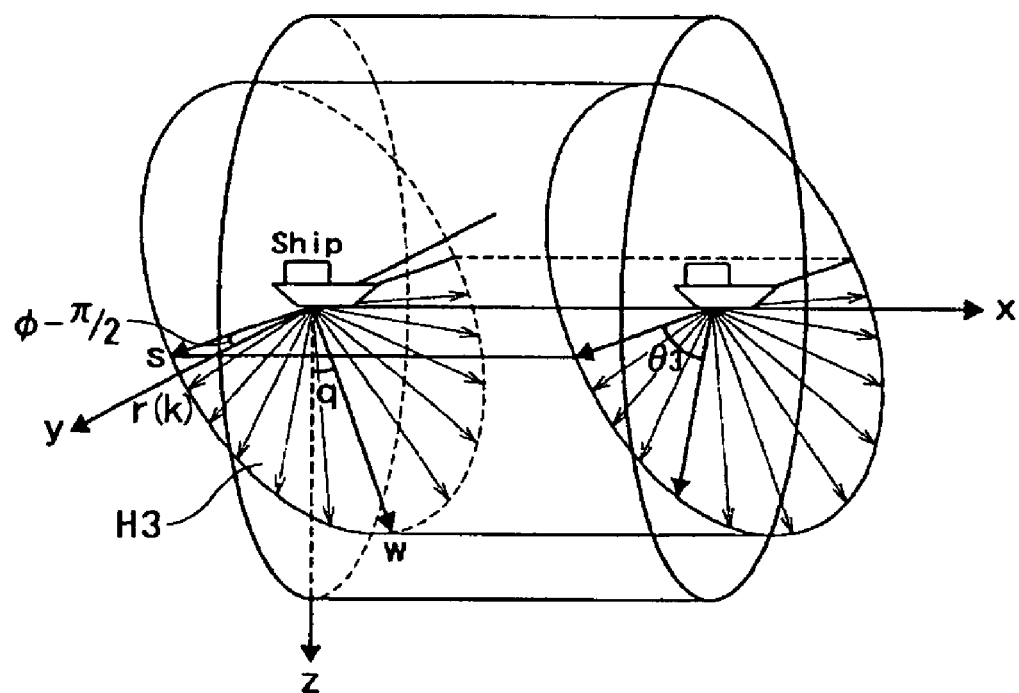
FIG. 14 is a diagram showing a model of an inclined oblique axis cylindrical coordinate system.
Figure 15:
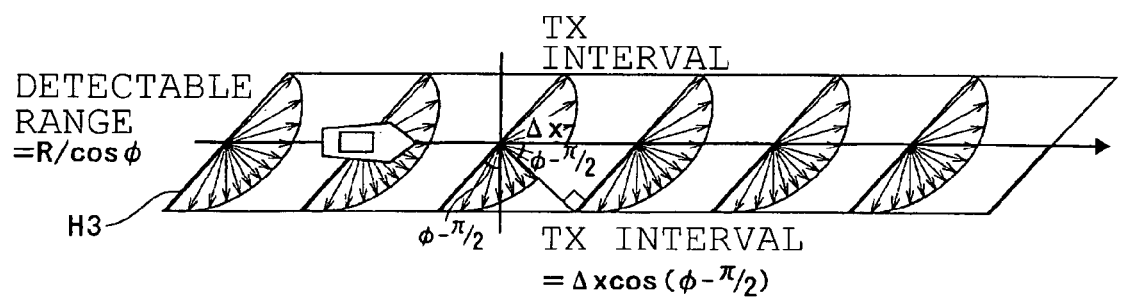
FIG. 15 is a plan view showing a model of how the ship shown in FIG. 14 advances.

FIG. 14 is a diagram showing a model of the inclined oblique axis cylindrical coordinate system, and FIG. 15 is a plan view showing a model of how the ship shown in FIG. 14 advances. As illustrated in FIG. 14, the ship 7 is moving in the positive direction of the x-axis while steering the acoustic beam along a twisted slant plane H3. An algorithm used for calculating the fish quantity information in this case is explained below. The "twisted slant plane H3" is an imaginary plane containing an imaginary s-axis which intersects the x-axis at a specific angle $\phi$ as measured clockwise in a horizontal direction and a w'-axis (downward-pointing axis) which intersects the x-axis at a specific angle q in an imaginary plane (third plane) containing an axis (not shown) perpendicular to the s-axis in the xy-plane and the z-axis. As explained with reference to the Third Example, the s-axis is an imaginary axis in the xy-plane that intersects the y-axis at an angle of $(\phi-\pi/2)$ (rad) as measured clockwise in the horizontal direction.

The scanning sonar emits the acoustic sounding beam in the depth direction into the body of sea water while varying angle $\theta_3$ of the acoustic sounding beam in the twisted slant plane H3 with respect to the s-axis, where the angle $\theta_3$ is an angle which varies within a range of $0 \leq \theta_3 \leq \pi$ (rad).

If equivalent input sound intensities $P_M^2$ picked up by the receiving beam are obtained by steering the acoustic beam along the twisted slant plane H3, it is possible to apply the aforementioned principle of fish quantity information calculation using the cylindrical coordinate system. The algorithm used for calculating the fish quantity information using the inclined oblique axis cylindrical coordinate system is explained in the following.

First, a range of measurement of the multibeam sonar 1, or transmit/receive directions of the acoustic beam, is set, in which the transmit/receive directions are expressed in terms of r(k), $\theta_3$(i), x(j). Here, the range of measurement in the r direction is $0 \leq r \leq$ (detectable range of the acoustic beam) (m), the range of measurement in the $\theta_3$ direction is $0 \leq \theta_3 \leq$ the range x direction is $0 \leq x \leq$ (distance traveled by the ship 7) (m).

Here, when the acoustic beam transmitted along the twisted slant plane H3 is reflected from inside the fish school FS and a resultant echo is received by the receiving beam, the equivalent input sound intensities $P_M^2$ picked up by the receiving beam are displayed on the display section 6 in the form of data painted in darker and lighter shades as shown in FIG. 5 in the First Example or as shown in FIG. 9 in the Second Example (not illustrated in the present Example).

Next, the equivalent input sound intensities $P_M^2$ picked up by the receiving beam with the acoustic beam emitted along the imaginary twisted slant plane H3 are subjected to two-dimensional echo integration. Since the transducer 2 has a spherical shape, the value of two-dimensional echo integration $S_j$ along the twisted vertical plane H2 is expressed by equation (44) below:

$$S_j = \sum_i \sum_k P_{M,i,j,k}^2 \cdot (k\Delta r)^3 \cdot (e^{2\alpha \Delta k r})^2 \quad (44)$$

$(i = 1, \ldots)(k = 1, \ldots)$ where $P_{Mi,j,k}^2$ represents the equivalent input sound intensities for individual volume elements (r, $\theta_3$, x) and $P_O^2$ represents the transmit signal intensity as in the First to Third Examples.

Next, transmit/receive intervals of the acoustic beam are calculated. The transmit/receive interval $\Delta x_j$ of the acoustic beam from the ship 7 is given by $\Delta x_j = \Delta x \cos(\phi-\pi/2)$ (refer to FIG. 15), where $\Delta x$ is expressed by $\Delta x = v \times \Delta t$ given the ship speed v and transmit time interval $\Delta\Delta t$ of the acoustic beam.

There exist a plurality of methods of calculating $\Delta x_j$. For example, it is possible to calculate a transmission-to-transmission distance at each j value along the x direction from latitude and longitude values as shown by equation (45) below:

$$\Delta x_j = 1852 \cdot \sqrt{(\text{Lat}_j - \text{Lat}_{j-1})^2 + ((\text{Long}_j - \text{Long}_{j-1}) \cdot \cos(\text{Lat}_j))^2} \quad (45)$$

where a coefficient "1852" in equation (45) is a unit conversion factor used for conversion from miles (n.m.) to meters, "$\text{Lat}_j$" represents latitude (minutes) of the ship at each j value and "$\text{Lon}_j$" represents longitude (minutes) of the ship at each j value.

Then, values of two-dimensional echo integration $S_j$ obtained on the twisted slant plane H3 are volumetrically integrated along the moving direction of the ship. Applying equation (9), we obtain equation (46) below:

$$N \cdot Ts = \frac{2}{c\tau} \cdot \frac{\Delta\theta_3 \cdot \Delta r \cdot \cos\left(\theta - \frac{\pi}{2}\right) \cdot \cos q}{P_0^2 \cdot \psi} \cdot \sum_j S_j \cdot \Delta x_j \quad (46)$$

Thus, if Ts of a fish body is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the angle $\theta_3$ of the acoustic beam with respect to the s-axis in the twisted slant plane H3 within the range of $0 \leq \theta_3 \leq \pi$ (rad) in the present Example, the range of the angle $\theta_3$ is not limited thereto but the angle $\theta_3$ may be made variable over a desired range if this range is within $0 \leq \theta_3 \leq$ Also, while the fish quantity information about the fish school FS is calculated on the assumption that the multibeam sonar transmits and receives the acoustic beam while varying the angle $\theta_3$ of the acoustic beam with respect to the s-axis in the twisted slant plane H3 in the present Example, the invention is not limited thereto. For example, the fish quantity information may be calculated on the assumption that the multibeam sonar varies the angle with respect to the w'-axis in the twisted slant plane H3.

Also, the present Example is not limited to an arrangement in which the s-axis intersects the y-axis in the clockwise direction but may employ an arrangement in which the s-axis intersects the y-axis in the counterclockwise direction. In the latter case, the angle $(\phi - \pi/2)$ (rad) of the s-axis with respect to the y-axis measured counterclockwise is negative, or $(\phi - \pi/2) < 0$.

Also, while the foregoing discussion of the present Example has illustrated a case where the transducer 2 has a spherical shape, the transducer 2 is not limited thereto but may have a cylindrical shape. The latter case can be expressed by substituting equation (47) for equation (44), and substituting equation (48) for equation (46).

$$S_j = \sum_i \sum_k P_{M,i,j,k}^2 \cdot (k\Delta r)^3 \cdot (e^{2\alpha k \Delta r})^2 \cdot \frac{1}{P_0(\theta)^2 \cdot \psi(\theta)} \quad (47)$$

$(i = 1, \ldots)(k = 1, \ldots)$ $$N \cdot Ts = \frac{2}{c\tau} \cdot \Delta\theta_3 \cdot \Delta r \cdot \cos\left(\phi - \frac{\pi}{2}\right) \cdot \cos q \cdot \sum_j S_j \cdot \frac{1}{P_0(\theta)^2 \cdot \psi(\theta)} \cdot \Delta x_j \quad (48)$$

FIFTH EXAMPLE

The Fifth Example is a practical example of a method of calculating fish quantity information using a horizontally moving umbrellalike surface coordinate system. In this Example, it is possible to apply the aforementioned principle of fish quantity information calculation using the cylindrical coordinate system as in the Second to Fourth Examples. Here, it is assumed that the transducer 2 has a spherical shape. The principle of fish quantity information calculation using the cylindrical coordinate system of the Fifth Example is now described with reference to FIGS. 16 to 20.

Figure 16:
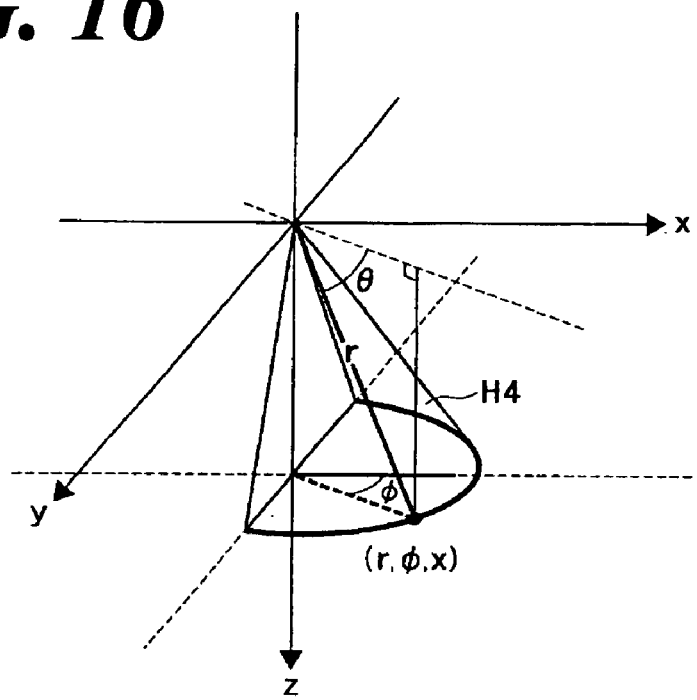
FIG. 16 is a diagram showing a model of a horizontally moving umbrellalike surface coordinate system.
Figure 17:
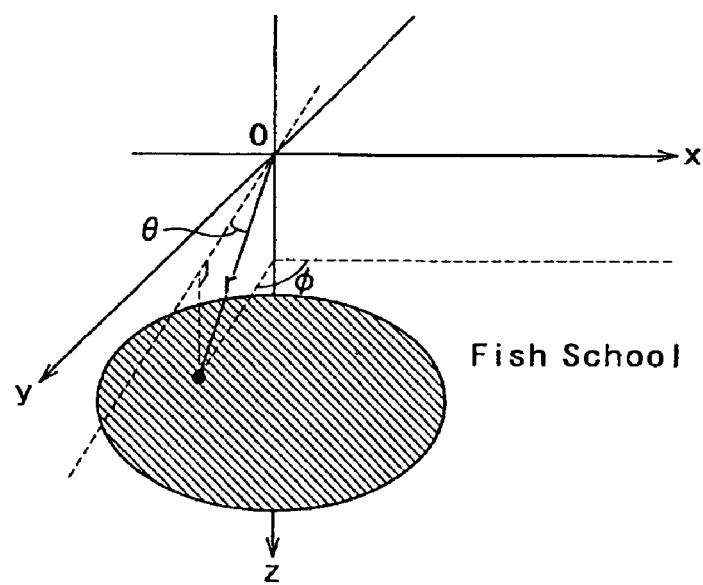
FIG. 17 is a diagram showing a positional relationship between a transducer and a fish school.

FIG. 16 is a diagram showing a model of the horizontally moving umbrellalike surface coordinate system, and FIG. 17 is a diagram showing a positional relationship between the transducer 2 (origin O) and a fish school FS.

As illustrated in FIG. 16, the ship 7 is moving in the positive direction of the x-axis while steering the acoustic beam along an umbrellalike surface H4 formed around the ship 7. An algorithm used for calculating the fish quantity information in this case is explained below. The "umbrellalike surface H4" is an imaginary plane formed around the ship 7 when the angle $\theta$ is varied with the angle $\theta$ held constant, where the angle $\theta$ is an angle set within a range of $0 \leq \theta \leq \pi/2$ (rad).

The scanning sonar emits the acoustic sounding beam in the depth direction into the body of sea water while varying the angle $\phi$ of the acoustic sounding beam measured clockwise respect to the xz-plane, where the angle $\phi$ is an angle which varies within a range of $-\pi/2 \leq q \leq \pi/2$ (rad).

Referring to FIG. 17, if the density of the fish school FS is $n(r, \theta_1, x)$, the total number N of fishes in the fish school can be expressed by equation (49) below:

$$N = \int n(r, \phi, x) \cdot \cos\theta \cdot r \cdot \cos\theta \cdot \sin\theta \cdot dr d\theta dx \quad (49)$$

When a transmitting beam emitted in a direction of $(r, \phi, x)$ from the transducer 2 is reflected by the fish school FS and the transducer receives the echo thus reflected by the receiving beam, equivalent input sound intensity $P_M^2$ obtained from the received echo is processed by the signal processing section 5. A sequence of operations performed on the equivalent input sound intensity $P_M^2$ by the signal processing section 5 is explained below.

Given a beam angle $\phi$ with respect to the xz-plane as measured clockwise on the umbrellalike surface H4, range r in the beam transmitting direction and range x in the x-axis direction, the equivalent input sound intensity $P_M^2(r, \phi, x)$ can be expressed by equation (50) below:

$$P_M^2(r, \phi, x) = \quad (50)$$
$$Ts \cdot \frac{P_0^2}{r^4}(e^{-2\alpha r})^2 \cdot \int n(r', \phi', x') \cdot h(r', \phi', x'; r, \phi, x) \cdot \cos\phi' \cdot r' \cdot \cos\theta \cdot \sin\theta \cdot dr' d\phi' dx'$$

where $P_O^2$ is the transmit signal intensity, a is the absorption loss coefficient, and h is the spread function:

Then, the multibeam sonar successively acquires and integrates equivalent input sound intensities $P_M^2$ derived from individual volume elements along the r, $\phi$ and x directions. Multiplying equation (50) by the time-varied gain (TVG) and volume element, we obtain equation (51) below:

$$\int P_M^2(r, \phi, x) \cdot r^2 \cdot (e^{2\alpha r})^2 \cdot \cos\phi \cdot r \cdot \cos\theta \cdot \sin\theta \cdot dr d\phi dx = \int Ts \cdot \frac{P_0^2}{r^4}(e^{-2\alpha r})^2 \cdot \int n(r', \phi', x') \cdot \quad (51)$$
$$h(r', \phi', x'; r, \phi, x) \cdot \cos\phi' \cdot r' \cdot \cos\theta \cdot \sin\theta \cdot dr' d\phi' dx' \cdot r^3 \cdot (e^{2\alpha r})^2 \cdot \cos\phi \cdot \cos\theta \cdot dr d\phi dx$$
$$= Ts \cdot P_0^2 \cdot \int n(r', \phi', x') \cdot \left\{ \int \frac{h(r', \phi', x'; r, \phi, x)}{r} \cos\phi \cdot \cos\theta \cdot \sin\theta \cdot dr d\phi dx \right\} \cdot \cos\phi' \cdot r' \cdot \cos\theta \cdot \sin\theta \cdot dr' d\phi' dx'$$

Here, the integration in brackets { } in equation (51) can be developed as shown by equation (52) below:

$$\int \frac{h(r', \phi', x'; r, \phi, x)}{r} \cos\phi \cdot \cos\theta \cdot \sin\theta \cdot dr d\phi dx = \int \frac{h(r', \phi', x'; r, \phi, x)}{r^2} \cos\phi \cdot r \cdot \cos\theta \cdot \sin\theta \cdot dr d\phi dx \quad (52)$$
$$= \frac{c\tau}{2} \cdot \psi$$

where it is assumed that r is sufficiently larger than cτ/2, c representing the sound velocity, τ representing the pulse-length, and ψ representing the equivalent beam width. Substituting equation (52) and equation (49) into equation (51), we obtain equation (53) below:

$$Ts \cdot P_0^2 \cdot \int n(r', \phi', x') \cdot \qquad (53)$$

$$\left\{ \int \frac{h(r', \phi', x'; r, \phi, x)}{r} \cos\phi \cdot \cos\theta \cdot \sin\theta \cdot dr d\phi dx \right\} = Ts \cdot P_0^2 \cdot \int n(r', \phi', x') \cdot \frac{c\tau}{2} \psi \cdot$$

$$\cos\phi' \cdot r' \cdot \cos\theta \cdot \sin\theta \cdot dr' d\phi' dx'$$

$$\cos\phi' \cdot r' \cdot \cos\theta \cdot \sin\theta \cdot dr' d\phi' dx'$$

$$= Ts \cdot P_0^2 \cdot N \frac{c\tau}{2} \psi$$

Rewriting equation (53), we obtain equation (54) below:

$$N \cdot Ts = \qquad (54)$$

$$\frac{2}{c\tau} \cdot \frac{1}{P_0^2 \cdot \psi} \int P_M^2(r, \phi, x) \cdot r^2 \cdot (e^{2\alpha r})^2 \cdot \cos\phi \cdot r \cdot \cos\theta \cdot \sin\theta \cdot dr d\phi dx$$

Derived from signals actually received by the multibeam sonar is data obtained when the ship 7 runs in the positive direction of the x-axis direction while scanning across the umbrellalike surface H4. Assuming that a beam angle increment in the umbrellalike surface H4 is Δφ as measured clockwise with respect to the xz-plane, a transmit interval in the x-axis direction is Δx, a beam angle increment in the r direction is Δr, and an output obtained with the acoustic beam from a point of the ith coordinate in the φ direction, the jth coordinate in the x direction and the kth coordinate in the r direction is $P_{Mi,j,k}$, equation (54) shown above can be expressed by equation (55) below:

$$N \cdot Ts = \cos\theta \cdot \sin\theta \cdot \frac{2}{c\tau} \cdot \frac{\Delta\phi \Delta z \Delta r}{P_0^2 \cdot \psi} \qquad (55)$$

$$\sum_i \sum_j \sum_k P_{Mi,j,k}^2 \cdot (k\Delta r)^3 \cdot (e^{2\alpha k \Delta r})^2 \cdot \cos(j \cdot \Delta\phi)$$

The principle of fish quantity information calculation using the horizontally moving umbrellalike surface coordinate system is an adapted form of the aforementioned principle of fish quantity information calculation using the cylindrical coordinate system as discussed above.

In the Fifth Example, a range of measurement of the multibeam sonar 1, or transmit/receive directions of the acoustic beam, is set at first, in which the transmit/receive directions are expressed in terms of r(k), φ(i), x(j). Here, the range of measurement in the φ direction is $-\pi/2 \leq \phi \leq \pi/2$ (rad), the range of measurement in the range x direction is $0 \leq x \leq$ (distance traveled by the ship 7) (m), and the range of measurement in the r direction is $0 \leq r \leq$ (detectable range of the acoustic beam) (m).

Figure 18:
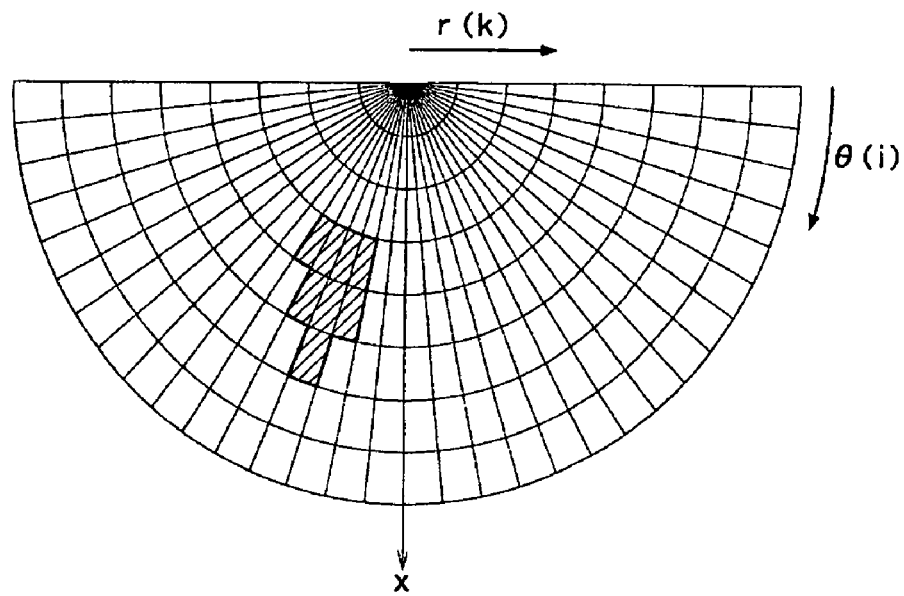
FIG. 18 is a diagram showing data picked up by the receiving beam when the acoustic beam is steered along an imaginary umbrellalike surface within a range of π/2 φπ/2 (rad)
Figure 19:
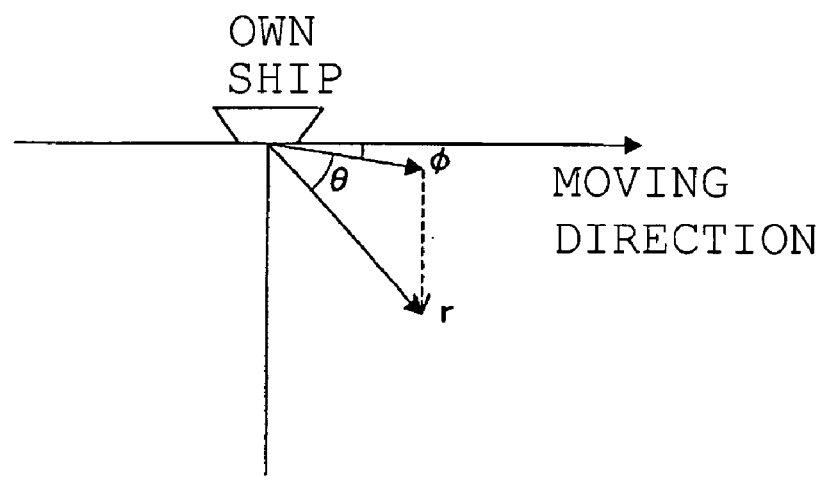
FIG. 19 is a diagram showing a relationship between a moving direction of the ship and a direction in which the acoustic sounding beam is emitted.

Here, when the acoustic beam transmitted along the imaginary umbrellalike surface H4 is reflected from the fish school FS and a resultant echo is received by the receiving beam, the equivalent input sound intensities $P_M^2$ picked up by the receiving beam are displayed on the display section 6 in the form of data painted in darker and lighter shades as shown in FIG. 18. FIG. 18 is a diagram showing data picked up by the receiving beam when the acoustic beam is steered along the umbrellalike surface H4 within the range of $-\pi/2 \leq \phi \leq \pi/2$ (rad). FIG. 19 is a diagram showing a relationship between the moving direction of the ship 7 and the direction r in which the acoustic sounding beam is emitted.

Next, the equivalent input sound intensities $P_M^2$ picked up by the receiving beam with the acoustic beam emitted along the imaginary umbrellalike surface H4 are subjected to two-dimensional echo integration. Since the transducer 2 has a spherical shape, the value of echo integration $S_j$ along the umbrellalike surface H4 is expressed by equation (56) below:

$$s_{i,j} = \sum_k P_{M,i,j,k}^2 \cdot (k\Delta r)^3 \cdot (e^{2\alpha k\Delta r})^2 \quad (k = 1, \dots) \qquad (56)$$

$S_{i,j}$ in equation (56) is expressed by equation (57) below:

$$s_j = \sum_i s_{i,j} \cdot (\cos\phi) \quad (i = 1, \dots) \qquad (57)$$

Also, $P_{Mi,j,k}^2$ represents the equivalent input sound intensities derived from individual volume elements (r, φ, x) and $P_O^2$ represents the transmit signal intensity as explained in the first and second principles.

Figure 20:
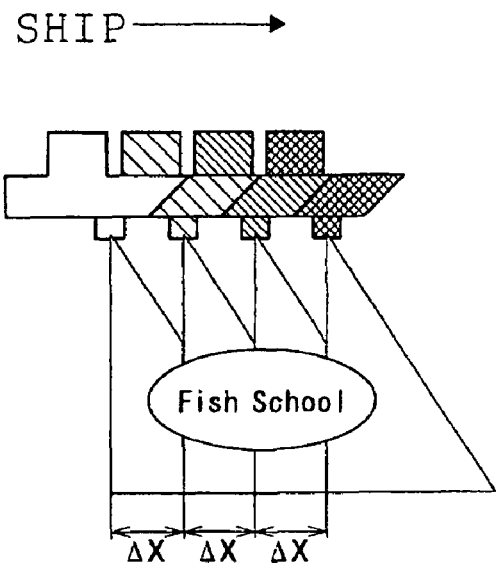
FIG. 20 is a diagram showing a model of how the ship advances.

Transmit/receive intervals of the acoustic beam transmitted from and received by the ship 7 are calculated. Here, the transmit/receive interval $\Delta x_j$ of the acoustic beam from the ship 7 represents each distance shown in FIG. 20, which is expressed by equation (58) below. FIG. 20 is a diagram showing a model of how the ship 7 advances.

$$\Delta x_j = 1852 \cdot \sqrt{\frac{(Lat_j - Lat_{j-1})^2 +}{((Long_j - Long_{j-1}) \cdot \cos(Lat_j))^2}} \quad (j = 1, \dots) \qquad (58)$$

A coefficient "1852" in equation (29) is a unit conversion factor used for conversion from miles (n.m.) to meters. Also, "$Lat_j$" represents latitude (minutes) of the ship at each j value and "$Lon_j$" represents longitude (minutes) of the ship at each j value.

Then, values of two-dimensional echo integration $S_j$ obtained on the umbrellalike surface H4 are volumetrically integrated along the moving direction of the ship. Applying equation (9), we obtain equation (59) below:

$$N \cdot Ts = \cos\theta \cdot \sin\theta \cdot \frac{2}{c\tau} \cdot \frac{\Delta\phi \Delta r}{P_0^2 \cdot \psi} \cdot \sum_j s_j \cdot \Delta x_j \quad (j = 1, \dots) \qquad (59)$$

Thus, if Ts of a fish body is determined, it is possible to calculate the approximate number of fishes within the fish school FS. The approximate number N of fishes within the fish school FS thus calculated is displayed on the display section 6 as explained in the First to Fourth Examples.

Although the multibeam sonar transmits and receives the acoustic beam while varying the angle φ thereof measured clockwise respect to the xz-plane within the range of $-\pi/2 \leq \phi \leq \pi/2$ (rad) with the angle θ with respect to the xy-plane held constant in the present Example, the range of the angle φ is not limited thereto but may be made variable over a desired range. Thus, transmit/receive area of the acoustic beam may be made variable within a range of $\pi/2 \leq \phi \leq 3\pi/2$ (rad), a range of $0 \leq \phi \leq \pi$ (rad), a range of $-\pi \leq \phi \leq 0$ (rad), a range of $0 \leq \phi \leq 3\pi/2$ (rad) or a range of $0 \leq \phi \leq 2\pi$ (rad), for example.

Also, while the foregoing discussion of the present Example has illustrated a case where the transducer 2 has a spherical shape, the transducer 2 is not limited thereto but may have a cylindrical shape. The latter case can be expressed by substituting equation (60) for equation (50), substituting equation (61) for equation (51), substituting equation (62) for equation (52), substituting equation (63) for equation (53), substituting equation (64) for equation (54), substituting equation (65) for equation (55), and substituting equation (66) for equation (59), in which the transmit signal intensity is expressed as $P_O^2(\theta)$ and the equivalent beam width is expressed as $\psi(\theta)$.

$$P_M^2(r, \phi, x) = \quad (60)$$
$$Ts \cdot \frac{P_0(\theta)^2}{r^4}(e^{-2\alpha r})^2 \cdot \int n(r', \phi', x') \cdot h(r', \phi', x'; r, \phi, x) \cdot \cos\phi' \cdot r' \cdot \sin\theta \cdot \cos\theta \cdot dr' d\phi' dx'$$

$$\int \frac{P_M^2(r, \phi, x)}{P_0(\theta) \cdot \psi(\theta)} \cdot r^2 \cdot (e^{2\alpha r})^2 \cdot \cos\phi \cdot r \cdot \sin\theta \cdot \cos\theta \cdot dr d\phi dx = \int Ts \cdot r^4 (e^{-2\alpha r})^2 \cdot \int n(r', \phi', x') \cdot \frac{h(r', \phi', x'; r, \phi, x)}{\psi(\theta)} \cdot \cos\phi' \cdot r' \cdot \sin\theta \cdot \cos\theta \cdot dr' d\phi' dx' \cdot r^3 \cdot (e^{2\alpha r})^2 \cdot \cos\phi \cdot \sin\theta \cdot \cos\theta \cdot dr d\phi dx \quad (61)$$

$$= Ts \cdot \int n(r', \phi', x') \cdot \left\{ \int \frac{h(r', \phi', x'; r, \phi, x)}{r \cdot \psi(\theta)} \cos\phi \cdot \sin\theta \cdot \cos\theta \cdot dr d\phi dx \right\} \cdot \cos\phi' \cdot r' \cdot \sin\theta \cdot \cos\theta \cdot dr' d\phi' dx'$$

$$\int \frac{h(r', \phi', x'; r, \phi, x)}{r \cdot \psi(\theta)} \cos\phi \cdot \cos\theta \cdot \sin\theta \cdot dr d\phi dx = \int \frac{h(r', \phi', x'; r, \phi, x)}{r^2 \cdot \psi(\theta)} \cdot \cos\phi \cdot r \cdot \cos\theta \cdot \sin\theta \cdot dr d\phi dx = \frac{c\tau}{2} \quad (62)$$

$$Ts \cdot \int n(r', \phi', x') \cdot \left\{ \int \frac{h(r', \phi', x'; r, \phi, x)}{r \cdot \psi(\theta)} \cos\phi \cdot \sin\theta \cdot \cos\theta \cdot dr d\phi dx \right\} \cdot \cos\phi' \cdot r' \cdot \sin\theta \cdot \cos\theta \cdot dr' d\phi' dx' = Ts \cdot \int n(r', \phi', x') \cdot \frac{c\tau}{2} \cdot \cos\phi' \cdot r' \cdot \sin\theta \cdot \cos\theta \cdot dr' d\phi' dx' = Ts \cdot N \frac{c\tau}{2} \quad (63)$$

$$N \cdot Ts = \frac{2}{c\tau} \cdot \frac{1}{P_0(\theta)^2 \cdot \psi(\theta)} \quad (64)$$
$$\int P_M^2(r, \phi, x) \cdot r^2 \cdot (e^{2\alpha r})^2 \cdot \cos\phi \cdot r \cdot \sin\theta \cdot \cos\theta \cdot dr d\phi dx$$

$$N \cdot Ts = \sin\theta \cdot \cos\theta \cdot \frac{2}{c\tau} \cdot \frac{\Delta\phi\Delta r}{P_0(\theta)^2 \cdot \psi(\theta)} \quad (65)$$
$$\sum_i \sum_j \sum_k P_{M_{i,j,k}}^2 \cdot (k\Delta r)^3 \cdot (e^{2\alpha k\Delta r})^2 \cdot \cos(j \cdot \Delta\phi) \cdot \Delta x_j$$

-continued $$N \cdot Ts = \cos\theta \cdot \sin\theta \cdot \frac{2}{c\tau} \cdot \frac{\Delta\phi\Delta r}{P_0(\theta)^2 \cdot \psi(\theta)} \cdot \sum_j Sj \cdot \Delta x_j \quad (66)$$

Second Embodiment

The principle of calculating the fish quantity information by use of a spherical coordinate system and three specific forms thereof using this principle are described below with reference to Sixth to Eighth Examples.

Figure 21:
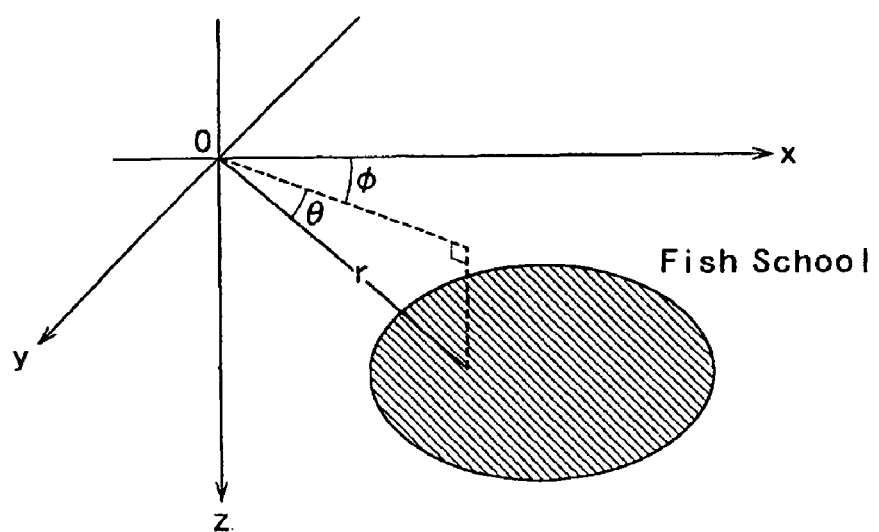
FIG. 21 is a diagram showing a model of a spherical coordinate system.

Principle of Fish Quantity Information Calculation Using Spherical Coordinate System The principle of fish quantity information calculation using the spherical coordinate system is explained with reference to FIG. 21. Here, it is assumed that the transducer 2 has a spherical shape. FIG. 21 is a diagram showing a model of the spherical coordinate system.

Discussed below is a situation in which an acoustic sounding beam emitted into a body of sea water from the transducer 2 is reflected from a fish school FS and the transducer 2 receives an echo thus reflected by a receiving beam as illustrated in FIG. 21. Here, the acoustic sounding beam is emitted in a direction having an angle $\theta$ in a depth direction into the body of sea water with respect to the xy-plane and a angle $\phi$ measured clockwise with respect to the xz-plane, in which the range of the angle $\theta$ is $0 \leq \theta \leq \pi/2$ (rad) and the range of the angle $\phi$ is $0 \leq \phi \leq 2\pi$(rad).

Two-dimensional directions of the acoustic beam transmitted and received from the ship 7 may be regarded as directions along an imaginary plane formed when one of the angle $\theta$ with respect to the xy-plane and the angle $\phi$ with respect to the xz-plane is held unchanged. Then, three-dimensional integration is performed by varying one of the angle $\theta$ with respect to the xy-plane and the angle $\phi$ with respect to the xz-plane which has been held unchanged next. The range of the angle $\theta$ with respect to the xy-plane is $0 \leq \theta \leq \pi/2$ (rad) and the range of the angle $\phi$ with respect to the xz-plane is $0 \leq \phi \leq 2\pi$ (rad).

Referring to FIG. 21, the total number N of fishes in the fish school FS can be expresses by equation (67) below, given the density $n(r, \theta, \phi)$ of the fish school FS:

$$N = \int n(r, \theta, \phi) \cdot r^2 \cos\theta \cdot dr d\theta d\phi \quad (67)$$

Equivalent input sound intensity $P_M^2$ obtained when a transmitting beam emitted in a direction of $(r, \theta, \phi)$ is reflected by the fish school FS and the echo thus reflected is received by the receiving beam is processed by the signal processing section 5 according to a sequence of processing operations which is explained in the following.

Given the beam angle $\theta$ with respect to the xy-plane, the beam angle $\phi$ with respect to the x-axis and range r converted from time, the equivalent input sound intensity $P_M^2$ (r, $\theta$, x) can be expressed by equation (68) below:

$$P_M^2(r, \theta, \phi) = Ts \cdot \frac{P_0^2}{r^4} \quad (68)$$
$$(e^{-2\alpha r})^2 \cdot \int n(r', \theta', \phi') \cdot h(r', \theta', \phi'; r, \theta, \phi) \cdot r'^2 \cos\theta \cdot dr' d\theta' d\phi'$$

where $P_O{}^2$ is transmit signal intensity, a is an absorption loss coefficient, and h is a point spread function.

Then, the multibeam sonar successively acquires and integrates equivalent input sound intensities $P_M{}^2$ derived from individual volume elements (r, θ, φ) along the r, θ and φ directions. Multiplying equation (68) by the TVG and volume element and integrating the result along the r, θ and φ directions, we obtain equation (69) below:

$$\int P_M^2(r, \theta, \phi) \cdot r^4 (e^{2\alpha r})^2 \cos\theta \cdot dr d\theta d\phi = \qquad (69)$$
$$Ts \cdot P_0^2 \cdot \int n(r', \theta', \phi') \cdot \left\{ \int h(r', \theta', \phi'; r, \theta, \phi) \cdot \cos\theta \cdot dr d\theta d\phi \right\} \cdot r'^2$$
$$\cos\theta' \cdot dr' d\theta' d\phi'$$

Here, the integration in brackets { } in equation (69) can be developed as shown by equation (70) below:

$$\int h(r', \theta', \phi'; r, \theta, \phi) \cdot \cos\theta \cdot dr d\theta d\phi = \int \frac{h(r', \theta', \phi'; r, \theta, \phi)}{r^2} \cdot r^2 \cos\theta \cdot dr d\theta d\phi \qquad (70)$$
$$= \frac{1}{r'^2} \cdot \int h(r', \theta', \phi'; r, \theta, \phi) \cdot r^2 \cdot \cos\theta \cdot dr d\theta d\phi$$
$$= \frac{1}{r'^2} \cdot r'^2 \cdot \frac{c\tau}{2} \psi = \frac{c\tau}{2} \psi$$

Considering finiteness of h (with a spread of cτ/2 in the r direction) and regarding r having a constant value r' within an effective integration range of h, r is placed outside an integral in the third line of equation (70). Here, it is assumed that r is sufficiently larger than cτ/2, c representing the sound velocity, τ representing the pulselength, and ψ representing the equivalent beam width. Substituting equation (67) and equation (70) into equation (69), we obtain equation (71) below:

$$\int P_M^2(r, \theta, \phi) \cdot r^4 (e^{2\alpha r})^2 \cos\theta \cdot dr d\theta d\phi = Ts \cdot P_0^2 \cdot \frac{c\tau}{2} \psi \cdot \int n(r', \theta', \phi') \cdot r'^2 \cos\theta' \cdot dr' d\theta' d\phi' \qquad (71)$$
$$= Ts \cdot P_0^2 \cdot \frac{c\tau}{2} \psi \cdot N$$

Rewriting equation (71), we obtain equation (72) below:

$$N \cdot Ts = \frac{2}{c\tau} \cdot \frac{1}{P_0^2 \psi} \int P_M^2(r, \theta, \phi) \cdot r^4 (e^{2\alpha r})^2 \cdot \cos\theta \cdot dr d\theta d\phi \qquad (72)$$

From equation (72), the product of backscattering strength Ts of a single fish constituting the fish school FS and the number N of fishes in the fish school FS can be calculated based on the principle of fish quantity information calculation using the spherical coordinate system. Also, if the backscattering strength Ts of the single fish constituting the fish school FS is determined, the number N of fishes in the fish school FS can be calculated. It is possible to recognize an approximate value of the number N of fishes in the fish school FS in this fashion.

While the principle of fish quantity information calculation has been discussed for a case in which the transducer 2 has a spherical shape in the foregoing, the invention is not limited thereto but is applicable to a case where the transducer 2 has a cylindrical shape. In the latter case, it is necessary to take into consideration the dependence of the transmit signal intensity $P_O{}^2$ and the equivalent beam width ψ on the angle θ the r direction makes with the xy-plane. Thus, the latter case can be expressed by substituting equation (73) for equation (68), substituting equation (74) for equation (69), substituting equation (75) for equation (70), substituting equation (76) for equation (71), and substituting equation (77) for equation (72), in which the transmit signal intensity is expressed as $P_O{}^2(\theta)$ and the equivalent beam width is expressed as ψ(θ).

$$P_M^2(r, \theta, \phi) = Ts \cdot \frac{P_0^2(\theta)}{r^4} \qquad (73)$$
$$(e^{-2\alpha r})^2 \cdot \int n(r', \theta', \phi') \cdot h(r', \theta', \phi'; r, \theta, \phi) \cdot r'^2 \cos\theta' \cdot dr' d\theta' d\phi'$$

$$\int \frac{P_M^2(r, \theta, \phi)}{P_0^2(\theta) \cdot \psi(\theta)} \cdot r^4 (e^{2\alpha r})^2 \cos\theta \cdot dr d\theta d\phi = Ts \cdot \int n(r', \theta', \phi') \cdot \qquad (74)$$
$$\left\{ \int \frac{h(r', \theta', \phi'; r, \theta, \phi)}{\psi(\theta)} \cdot P_0(\theta)^2 \cdot \cos\theta \cdot dr d\theta d\phi \right\} \cdot$$
$$r'^2 \cos\theta' \cdot dr' d\theta' d\phi'$$

$$\int \frac{h(r', \theta', \phi'; r, \theta, \phi)}{\psi(\theta)} \cdot \cos\theta \cdot dr d\theta d\phi = \int \frac{h(r', \theta', \phi'; r, \theta, \phi)}{r^2 \cdot \psi(\theta)} \cdot r^2 \cos\theta \cdot dr d\theta d\phi \qquad (75)$$
$$= \frac{1}{r'^2} \cdot \int \frac{h(r', \theta', \phi'; r, \theta, \phi)}{\psi(\theta)} \cdot r^2 \cos\theta \cdot dr d\theta d\phi$$
$$= \frac{1}{r'^2} \cdot r'^2 \cdot \frac{c\tau}{2} \cdot = \frac{c\tau}{2}$$

$$\int \frac{P_M^2(r, \theta, \phi)}{P_0^2(\theta) \cdot \psi(\theta)} r^4 (e^{2\alpha r})^2 \cos\theta \cdot dr d\theta d\phi = Ts \cdot \frac{c\tau}{2} \cdot \int n(r', \theta', \phi') \cdot \qquad (76)$$
$$r'^2 \cos\theta' \cdot dr' d\theta' d\phi'$$
$$= Ts \cdot \frac{c\tau}{2} \cdot N$$

$$N \cdot Ts =$$
$$\frac{2}{c\tau} \cdot \int P_M^2(r, \theta, \phi) \cdot r^4 (e^{2\alpha r})^2 \cdot \frac{1}{P_0(\theta)^2 \cdot \psi(\theta)} \cdot \cos\theta \cdot dr d\theta d\phi \qquad (77)$$

A case where discretization along the directions of the angle θ and the angle φ is performed when the transducer 2 has a cylindrical shape is described. Multiplying both sides of equation (73) by $r^4(e^2\alpha^r)^2 \theta/(P_O{}^2(\theta)\psi(\theta))$ and integrating the same, we obtain equation (78) below:

$$\int P_M^2(r, \theta, \phi) \cdot r^4 (e^{2\alpha r})^2 \cdot \qquad (78)$$
$$\frac{1}{P_0^2(\theta) \psi(\theta)} \cos\theta \cdot dr d\theta d\phi = Ts \cdot \int n(r', \theta', \phi') \cdot$$

-continued $$\left\{ \int \frac{h(r', \theta', \phi'; r, \theta, \phi)}{r^2} \cdot \frac{1}{\psi(\theta)} \cdot r'^2 \cos\theta \cdot dr d\theta d\phi \right\} \cdot$$

$$r'^2 \cos\theta' \cdot dr' d\theta' d\phi'$$

$$= Ts \cdot \int n(r', \theta', \phi') \cdot \left( \frac{\frac{c\tau}{2} \cdot \psi(\theta') \cdot r'^2}{r'^2 \cdot \psi(\theta')} \right) \cdot r'^2 \cos\theta' \cdot dr' d\theta' d\phi'$$

$$= Ts \cdot \frac{c\tau}{2} \cdot \int n(r', \theta', \phi') \cdot r'^2 \cos\theta' \cdot dr' d\theta' d\phi' = Ts \cdot \frac{c\tau}{2} \cdot N$$

In equation (78), terms $1/r^2$ and $\psi(\theta)$ in an integral are approximated as $1/r^2 = 1/r'^2$ and $\psi(\theta) = \psi(\theta')$ and placed outside the integral of r, $\theta$, $\phi$. Rewriting equation (78), we obtain equation (79):

$$N \cdot Ts = \frac{2}{c\tau} \int P_M^2(r, \theta, \phi) \cdot r^4 (e^{2\alpha r})^2 \cdot \frac{1}{P_0^2(\theta)\psi(\theta)} \cos\theta \cdot dr d\theta d\phi \quad (79)$$

Provided that the acoustic beam transmitted from the actual multibeam sonar is reflected from inside the fish school FS and a resultant echo is received by the receiving beam, data is obtained along a beam direction r in the ($\theta$, $\phi$) direction. Here, assuming that a beam angle increment in the $\theta$ direction is $\Delta\theta$, a beam angle increment in the $\phi$ direction is $\Delta\phi$, and an output obtained with the acoustic beam from a point of the ith coordinate in the $\theta$ direction and the jth coordinate in the $\phi$ direction is $P_{Mi,j(r)}$, equation (79) is rewritten as equation (80) below:

$$N \cdot Ts = \frac{2\Delta\theta \cdot \Delta\phi}{c\tau} \quad (80)$$

$$\sum_i \sum_j \int_{Range} P_{Mi,j}(r)^2 \cdot r^4 (e^{2\alpha r})^2 \cdot \frac{1}{P_0^2(i\Delta\theta)\psi(i\Delta\theta)} \cos(i\Delta\theta) dr$$

The right side of equation (80) represents echo integration, from which it is possible to obtain an integral after with TVG correction $r^4 (e^2\alpha^r)^2$ and correction of the angle $\theta$. In addition, if Ts is known, it is possible to obtain the total number N of fishes from the value of echo integration. Furthermore, if discretization along the range r direction is performed, equation (80) can be expressed by equation (81) below:

$$N \cdot Ts = \frac{2\Delta\theta \cdot \Delta\phi \cdot \Delta r}{c\tau} \quad (81)$$

$$\sum_i \sum_j \sum_k P_{Mi,j,k}^2 \cdot (k\Delta r)^4 (e^{2\alpha k\Delta r})^2 \frac{1}{P_0^2(i\Delta\theta)\psi(i\Delta\theta)} \cos(i\Delta\theta)$$

From equation (81), the product of backscattering strength Ts of a single fish constituting the fish school FS and the number N of fishes in the fish school FS can be calculated based on the principle of fish quantity information calculation using the spherical coordinate system. Also, if the backscattering strength Ts of the single fish constituting the fish school FS is determined, the number N of fishes in the fish school FS can be calculated. It is possible to recognize an approximate value of the number N of fishes in the fish school FS in this fashion.

SIXTH EXAMPLE

Figure 22:
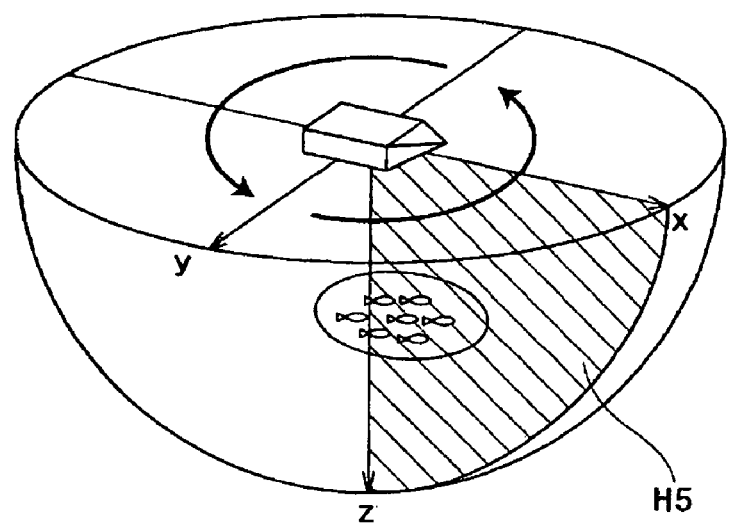
FIG. 22 is a diagram showing a model of how a direction in which the acoustic beam is emitted is varied such that a vertical plane H5 constituting a scanning surface rotates counterclockwise about a y-axis while the acoustic beam is steered along the vertical plane H5.
Figure 23:
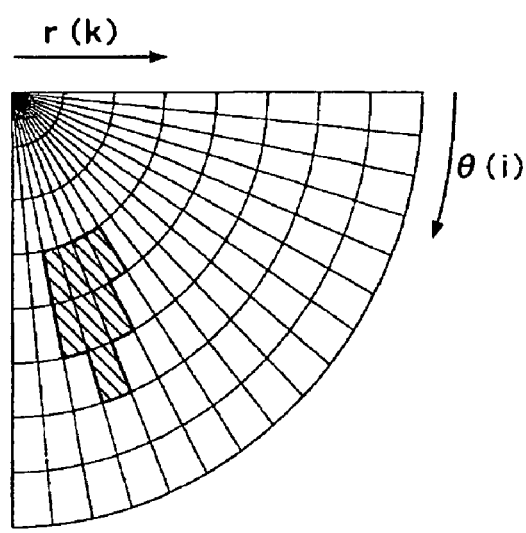
FIG. 23 is a diagram showing data obtained when the acoustic beam transmitted along the vertical plane H5 is reflected from inside a fish school FS and a resultant echo is received by a receiving beam.

The Sixth Example is described with reference to FIGS. 21 to 23. FIG. 22 is a diagram showing a model of how a direction in which the acoustic beam is emitted is varied such that an imaginary vertical plane H5 constituting a scanning surface rotates counterclockwise about the y-axis while the acoustic beam is steered along the vertical plane H5 containing the x-axis and the z-axis. FIG. 23 is a diagram showing data obtained when the acoustic beam transmitted along the vertical plane H5 is reflected from inside the fish school FS and a resultant echo is received by the receiving beam. The data shown in FIG. 23 indicates equivalent input sound intensities $P_M^2$ picked up by the receiving beam, so that the larger the equivalent input sound intensity $P_M^2$ picked up by the receiving beam, the higher the density shown in FIG. 23. The transducer 2 has a cylindrical shape.

Referring to FIG. 22, the scanning sonar emits the acoustic beam in a depth direction into the body of sea water while varying the angle $\theta$ with respect to the x-axis in the vertical plane H5 (or the angle with respect to the xy-plane). The direction in which the acoustic beam is emitted is varied such that the vertical plane H5 rotates about the z-axis (or such that the angle $\phi$ with respect to the xz-plane varies).

Here, the range of the angle $\theta$ with respect to the xy-plane is $0 \leq \theta \leq \pi/2$ (rad) and the range of the angle $\phi$ with respect to the xz-plane is $0 \leq \phi \leq 2\pi$ (rad). It is possible to perform three-dimensional integration by varying the transmit/receive direction of the acoustic beam such that the vertical plane H5 rotates about the z-axis while steering the acoustic beam along the vertical plane H5 as discussed above.

When equivalent input sound intensities $P_M^2$ are obtained as the acoustic beam scans along the imaginary vertical plane H5 and the receiving beam receives echoes reflected from inside the fish school FS, it is possible to calculate fish quantity information about the fish school FS based on the principle of fish quantity information calculation using the spherical coordinate system. An algorithm used for this calculation is explained in the following.

First, a range of measurement of the multibeam sonar, or transmit/receive directions of the acoustic beam, is set, in which the transmit/receive directions are expressed in terms of r(k), $\theta$(i), $\phi$(j). Here, the range of measurement in the r direction is $0 \leq r \leq$ (detectable range of the acoustic beam) (m), the range of measurement in the $\theta$ direction is $0 \leq \theta \leq \pi/2$ (rad), and the range of measurement in the ( direction is $-2\pi \leq \phi \leq 0$ (rad).

When the acoustic beam transmitted along the vertical plane H4 is reflected from inside the fish school FS and the resultant echo is received by the receiving beam, the equivalent input sound intensities $P_M^2$ picked up by the receiving beam are displayed on the display section 6 in the form of data painted in darker and lighter shades as shown in FIG. 23.

Next, the equivalent input sound intensities $P_M^2$ picked up by the receiving beam are subjected to two-dimensional echo integration. Since the transducer 2 has a cylindrical shape, the value of two-dimensional echo integration $S_j$ along the vertical plane H5 is expressed by equation (82) below:

$$S_j = \sum_i \sum_k P_{Mi,j,k}^2 \cdot (k\Delta r)^4 (e^{2\alpha k \Delta r})^2 \frac{1}{P_0^2(i\Delta\theta)\psi(i\Delta\theta)} \cos(i\Delta\theta) \quad (82)$$

where $P_{Mi,j,k}^2$ represents the equivalent input sound intensities for individual volume elements $(\theta, \phi, r)$ and $P_O^2$ represents the transmit signal intensity.

Then, values of echo integration $S_j$ obtained on the imaginary vertical plane H5 are volumetrically integrated along a direction in which the angle $\phi$ measured clockwise with respect to the xz-plane varies by varying the transmit/receive direction of the acoustic beam such that the vertical plane H5 rotates counterclockwise about the z-axis. When the values of echo integration $S_j$ are volumetrically integrated along the imaginary vertical plane H5 and along the rotating direction of the vertical plane H5 (or the direction in which the angle $\phi$ with the xy-plane is varied) in this fashion, a resultant value of volume integration T is expressed by equation (83) below:

$$T = \sum_j S_j \quad (83)$$

Then, from equations (81) to (83), we obtain equation (84) below:

$$N \cdot Ts = \frac{2\Delta\theta \cdot \Delta\phi \cdot \Delta r}{c\tau} \cdot T \quad (84)$$

Thus, if Ts of a fish body is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the range of the angle $\theta$ with respect to the yz-plane within the range of $0 \leq \theta \leq \pi/2$ (rad) and the range of the angle $\phi$ measured clockwise with respect to the xz-plane within the range of $-2\pi \leq \phi \leq 0$ (rad) in the present Example, the invention is not limited thereto. For example, the angle $\theta$ with respect to the yz-plane may be made variable over a desired range if this range is within $0 \leq \theta \leq \pi$ (rad), and the angle $\phi$ measured clockwise with respect to the xz-plane may be made variable within a range of $0 \leq \phi \leq 2\pi$ (rad), $-\pi \leq \phi \leq 0$ (rad) or $0 \leq \phi \leq \pi$ (rad). It is possible to perform three-dimensional integration in the latter case as well.

Also, while the approximate number N of fishes within the fish school FS is calculated by using the angle $\phi$ measured clockwise with respect to the xz-plane as a reference in the present Example, the invention is not limited thereto but an angle measured counterclockwise with respect to the xz-plane may be used as a reference.

Also, while the foregoing discussion of the present Example has illustrated a case where the transducer 2 has a cylindrical shape, the transducer 2 is not limited thereto but may have a spherical shape. The latter case can be expressed by substituting equation (85) for equation (82), and substituting equation (86) for equation (84), in which the transmit signal intensity is expressed as $P_O^2(\theta)$ and the equivalent beam width is expressed as $\psi(\theta)$.

$$S_j = \sum_i \sum_k P_{Mi,j,k}^2 \cdot (k\Delta r)^4 (e^{2\alpha k \Delta r})^2 \cos(i\Delta\theta) \quad (85)$$

$$N \cdot Ts = \frac{2\Delta\theta \cdot \Delta\phi \cdot \Delta r}{c\tau} \cdot \frac{1}{P_0^2 \psi} \cdot T \quad (86)$$

SEVENTH EXAMPLE

Figure 24:
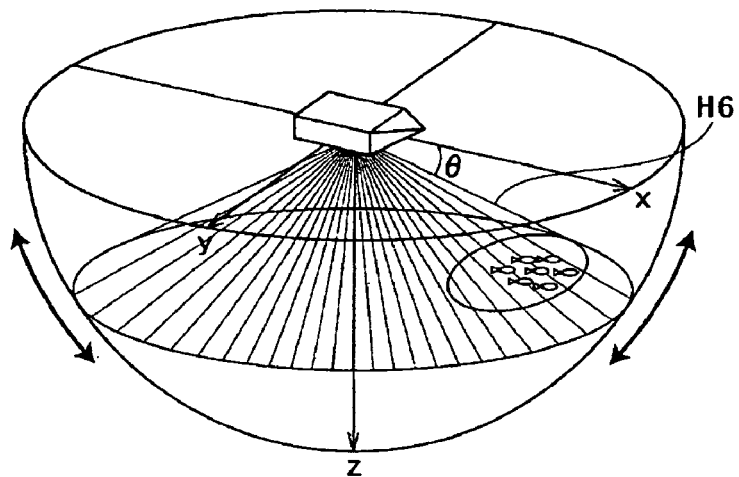
FIG. 24 is a diagram showing a model of how a direction in which the acoustic beam is emitted is varied such that an umbrellalike surface H6 constituting a scanning surface with respect to an xy-plane is varied while the acoustic beam is steered along the umbrellalike surface H6 formed around the ship.
Figure 25:
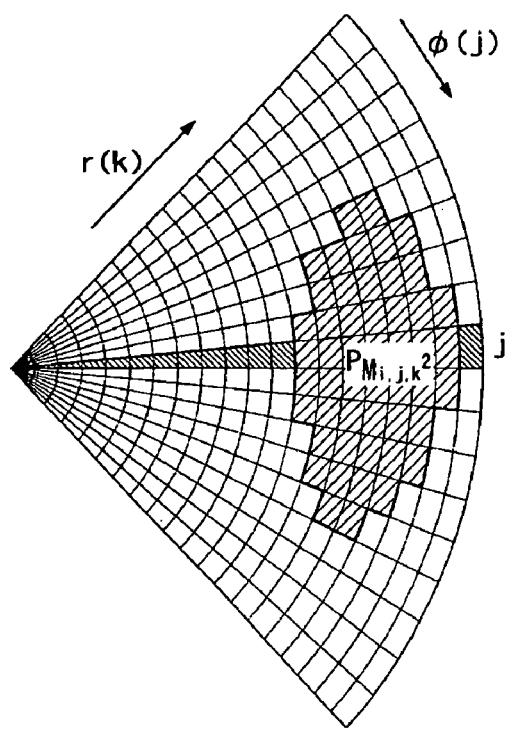
FIG. 25 is a diagram showing data obtained when the acoustic beam transmitted along the umbrellalike surface H6 is reflected from inside a fish school FS and a resultant echo is received by a receiving beam.

The Seventh Example is described with reference to FIGS. 21, 24 and 25. FIG. 24 is a diagram showing a model of how a direction in which the acoustic beam is emitted is varied such that the angle $\theta$ of the umbrellalike surface H6 constituting a scanning surface with respect to the xy-plane is varied while the acoustic beam is steered along the imaginary umbrellalike surface H6 formed around the ship 7. FIG. 25 is a diagram showing data obtained when the acoustic beam transmitted along the umbrellalike surface H6 is reflected from inside the fish school FS and a resultant echo is received by the receiving beam. The data shown in FIG. 25 indicates equivalent input sound intensities $P_M^2$ picked up by the receiving beam, so that the larger the equivalent input sound intensity $P_M^2$ picked up by the receiving beam, the higher the density shown in FIG. 25. The transducer 2 has a cylindrical shape.

Referring to FIG. 24, the scanning sonar emits the acoustic beam in a depth direction into the body of sea water while varying the angle $\phi$ of the acoustic beam measured clockwise with respect to the xz-plane within a range of $0 \leq \phi \leq 2\pi$(rad) with the angle $\theta$ with respect to the xy-plane held unchanged at a specific angle. Then, the direction in which the acoustic beam is emitted is varied such that the angle $\theta$ with respect to the xy-plane.

Here, the range of the angle $\phi$ measured clockwise with respect to the xz-plane is $0 \leq \phi \leq 2\pi$(rad) and the range of the angle $\theta$ with respect to the xy-plane is $0 \leq \phi \leq \pi/2$ (rad). It is possible to perform three-dimensional integration by varying the transmit/receive direction of the acoustic beam by varying the angle $\theta$ with respect to the xy-plane while steering the acoustic beam along the umbrellalike surface H6 as discussed above.

When equivalent input sound intensities $P_M^2$ are obtained as the acoustic beam scans along the umbrellalike surface H6 and the receiving beam receives echoes reflected from inside the fish school FS, it is possible to calculate fish quantity information about the fish school FS based on the principle of fish quantity information calculation using the spherical coordinate system. An algorithm used for this calculation is explained in the following.

First, a range of measurement of the multibeam sonar, or transmit/receive directions of the acoustic beam, is set, in which the transmit/receive directions are expressed in terms of $\theta(i)$, $\phi(j)$, $r(k)$. Here, the range of measurement in the r direction is $0 \leq r \leq$ (detectable range of the acoustic beam) (m), the range of measurement in the $\theta$ direction is $0 \leq \theta \leq \pi/2$ (rad), and the range of measurement in the $\phi$ direction is $-2\pi \leq \phi \leq 0$ (rad).

When the acoustic beam transmitted along the umbrellalike surface H6 is reflected from inside the fish school FS and the resultant echo is received by the receiving beam, the equivalent input sound intensities $P_M^2$ picked up by the receiving beam are displayed on the display section 6 in the form of data painted in darker and lighter shades as shown in FIG. 25.

Next, the equivalent input sound intensities $P_M^2$ picked up by the receiving beam are subjected to two-dimensional echo integration. Since the transducer 2 has a cylindrical shape, the value of two-dimensional echo integration $S_j$ along the umbrellalike surface H6 is expressed by equation (87) below:

$$S_j = \sum_i \sum_k P_{Mi,j,k}^2 \cdot (k\Delta r)^4 (e^{2\alpha k \Delta r})^2 \frac{1}{P_0^2(l\Delta\theta)\psi(l\Delta\theta)} \cos(i\Delta\theta) \quad (87)$$

where $P_{Mi,j,k}^2$ represents the equivalent input sound intensities for individual volume elements $(\theta, \phi, r)$ and $P_O^2$ represents the transmit signal intensity.

Then, values of echo integration $S_j$ obtained on the umbrellalike surface H6 are volumetrically integrated along a direction in which the angle $\theta$ with respect to the xy-plane varies by varying the transmit/receive direction of the acoustic beam such that the angle $\theta$ of the umbrellalike surface H6 with respect to the xy-plane varies. When the values of echo integration $S_j$ are volumetrically integrated along the imaginary umbrellalike surface H6 and along the direction in which the angle $\theta$ with respect to the xy-plane varies in this fashion, a resultant value of volume integration T is expressed by equation (88) below:

$$T = \sum_j S_j \quad (88)$$

Then, from equations (81), (87) and (88), we obtain equation (89) below:

$$N \cdot Ts = \frac{2\Delta\theta \cdot \Delta\phi \cdot \Delta r}{c\tau} \cdot T \quad (89)$$

Thus, if Ts of a fish body is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the range of the angle $\phi$ measured clockwise with respect to the xz-plane within the range of $0 \leq \phi \leq 2\pi$ (rad) and the range of the angle $\theta$ with respect to the xy-plane within the range of $0 \leq \theta \leq \pi$ (rad) in the present Example, the invention is not limited thereto. For example, the angle $\phi$ measured clockwise with respect to the xz-plane may be made variable within a range of $0 \leq \phi \leq 2\pi$ (rad), $-\pi \leq \phi \leq 0$ (rad) or $0 \leq \phi \leq \pi$ (rad), and the angle $\theta$ with respect to the xy-plane may be made variable over a desired range if this range is within $0 \leq \theta \leq \pi/2$ (rad). It is possible to perform three-dimensional integration in the latter case as well.

Also, while the approximate number N of fishes within the fish school FS is calculated by using the angle $\phi$ with respect to the xy-plane and the angle $\phi$ with respect to the xz-plane as references in the present Example, the invention is not limited thereto.

Also, while the foregoing discussion of the present Example has illustrated a case where the transducer 2 has a cylindrical shape, the transducer 2 is not limited thereto but may have a spherical shape. The latter case can be expressed by substituting equation (90) for equation (87), and substituting equation (91) for equation (89), in which the transmit signal intensity is expressed as $P_O^2(\theta)$ and the equivalent beam width is expressed as $\psi(\theta)$.

$$S_j = \sum_i \sum_k P_{Mi,j,k}^2 \cdot (k\Delta r)^4 (e^{2\alpha k \Delta r})^2 \cos(i\Delta\theta) \quad (90)$$

$$N \cdot Ts = \frac{2\Delta\theta \cdot \Delta\phi \cdot \Delta r}{c\tau} \cdot T \cdot \frac{1}{P_0^2 \psi} \quad (91)$$

EIGHTH EXAMPLE

Figure 26:
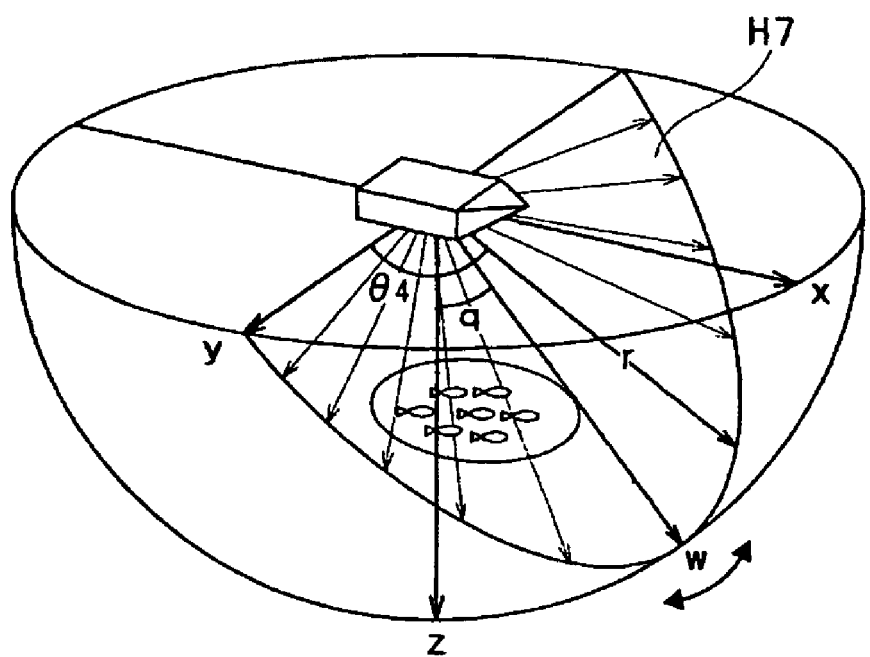
FIG. 26 is a diagram showing a model of how a direction in which the acoustic beam is emitted is varied such that a slant plane H7 constituting a scanning surface swings about the y-axis while the acoustic beam is steered along the slant plane H7.

The Eighth Example is described with reference to FIGS. 21 and 26. FIG. 26 is a diagram showing a model of how a direction in which the acoustic beam is emitted is varied such that a slant plane H7 constituting a scanning surface swings about the y-axis while the acoustic beam is steered along the slant plane H7. The "slant plane H7" which is identical to the slant plane H1 explained in the Second Example is an imaginary plane containing the y-axis and a w-axis which exists in the xz-plane, the w-axis being inclined toward the positive direction of the x-axis to intersect the z-axis at a specific angle q. The transducer 2 has a spherical shape.

Referring to FIG. 26, the scanning sonar emits the acoustic beam in a depth direction into the body of sea water while varying angle $\theta_4$ with respect to the y-axis in the slant plane H7. The direction in which the acoustic beam is emitted is varied such that the slant plane H7 swings about the y-axis (or such that the angle q by which the slant plane H7 is inclined toward the positive direction of the x-axis to intersect the z-axis varies).

Here, the range of the angle q of the slant plane H7 measured in the positive direction of the x-axis with respect to the z-axis is $-\pi/2 \leq q \leq \pi/2$ (rad) and the range of the angle $\theta_4$ with respect to the y-axis in the slant plane H7 is $0 \leq \theta_4 \leq \pi$ (rad). It is possible to perform three-dimensional integration by varying the transmit/receive direction of the acoustic beam such that the slant plane H7 swings about the y-axis while steering the acoustic beam along the slant plane H7 as discussed above.

When equivalent input sound intensities $P_M^2$ are obtained as the acoustic beam scans along the imaginary slant plane H7 and the receiving beam receives echoes reflected from inside the fish school FS, it is possible to calculate fish quantity information about the fish school FS based on the principle of fish quantity information calculation using the spherical coordinate system. An algorithm used for this calculation is explained in the following.

First, a range of measurement of the multibeam sonar, or transmit/receive directions of the acoustic beam, is set, in which the transmit/receive directions are expressed in terms of r(k), $\theta_4(i)$, q(j). Here, the range of measurement in the r direction is $0 \leq \leq$ (detectable range of the acoustic beam) (m), the range of measurement in the $\theta_4$ direction is $0 \leq \theta_4 \leq \pi$ (rad), and the range of measurement in the q direction is $-\pi/2 \leq q \leq \pi/2$ (rad).

When the acoustic beam transmitted along the slant plane H7 is reflected from inside the fish school FS and the resultant echo is received by the receiving beam, the equivalent input sound intensities $P_M^2$ picked up by the receiving beam are displayed on the display section 6 in the form of data painted in darker and lighter shades as in the First to Seventh Examples (not illustrated in this Example).

Next, the equivalent input sound intensities $P_M^2$ picked up by the receiving beam are subjected to two-dimensional echo integration. Since the transducer 2 has a spherical shape, the value of two-dimensional echo integration $S_j$ along the slant plane H7 is expressed by equation (92) below:

$$S_j = \sum_i \sum_k P_{Mi,j,k}^2 \cdot (k\Delta r)^4 (e^{2\alpha k \Delta r})^2 \sin(i\Delta\theta) \quad (92)$$

where $P_{Mi,j,k}^2$ represents the equivalent input sound intensities for individual volume elements ($\theta_4$, q, r) and $P_O^2$ represents the transmit signal intensity.

Then, values of echo integration $S_j$ obtained on the imaginary slant plane H7 are volumetrically integrated along a direction in which the angle q of the w-axis in the xz-plane with respect to the z-axis varies by varying the transmit/receive direction of the acoustic beam such that the slant plane H7 swings about the y-axis. When the values of echo integration $S_j$ are volumetrically integrated along the imaginary slant plane H7 and along the swinging direction of the slant plane H7 (or the direction in which the angle q of the w-axis with respect to the z-axis is varied) in this fashion, a resultant value of volume integration T is expressed by equation (93) below:

$$T = \sum_j S_j \quad (93)$$

Then, we obtain equation (94) below:

$$N \cdot Ts = \frac{2\Delta\theta_4 \cdot \Delta q \cdot \Delta r}{c\tau} \cdot \frac{1}{P_0^2 \psi} \cdot T \quad (94)$$

Thus, if Ts of a single fish is determined, it is possible to calculate the approximate number N of fishes within the fish school FS. The approximate number N of fishes within the fish school FS thus calculated is displayed on the display section 6.

Although the multibeam sonar transmits and receives the acoustic beam while varying the range of the angle q of the w-axis measured in the positive direction of the x-axis with respect to the z-axis within the range of $-\pi/2 \leq q \leq \pi/2$ (rad) and the range of the angle $\theta_4$ with respect to the y-axis within the range of $0 \leq \theta_4 \leq \pi$ (rad) in the present Example, the invention is not limited thereto. For example, the angle q measured in the positive direction of the x-axis with respect to the z-axis may be made variable over a desired range if this range is within $-\pi/2 \leq q \leq \pi/2$ (rad), and the angle $\theta_4$ with respect to the y-axis on the slant plane H7 may be made variable over a desired range if this range is within $0 \leq \theta_4 \leq \pi$ (rad). It is possible to perform three-dimensional integration in the latter case as well.

Also, while the present Example employs an arrangement in which the imaginary slant plane H7 containing the y-axis and the w-axis in the xz-plane swings about the y-axis, the w-axis being inclined toward the positive direction of the x-axis to intersect the z-axis at the specific angle q, the invention is not limited to this arrangement. For example, the present Example may be modified such that an imaginary plane containing the x-axis and an imaginary axis in the yz-plane swings about the x-axis, the imaginary axis being inclined toward the positive direction of the y-axis by a specific angle to intersect the z-axis.

Also, while the foregoing discussion of the present Example has illustrated a case where the transducer 2 has a spherical shape, the transducer 2 is not limited thereto but may have a cylindrical shape. The latter case can be expressed by substituting equation (95) for equation (92), and substituting equation (96) for equation (94), in which the transmit signal intensity is expressed as $P_O^2(\theta)$ and the equivalent beam width is expressed as $\psi(\theta)$. This means that the transmit signal intensity $P_O^2$ and the equivalent beam width $\psi$ depend on the angle $\theta$ respect to the xy-plane. This means that the transmit signal intensity $P_O^2$ and the equivalent beam width y depend on the angle $\theta$ of each beam with respect to the xy-plane.

$$S_j = \sum_j \sum_k P_{Mi,j,k}^2 \cdot (k\Delta r)^4 (e^{2\alpha k \Delta r})^2 \sin(i\Delta\theta_4) \cdot \frac{1}{P_0^2(\theta)\psi(\theta)} \quad (95)$$

$$N \cdot Ts = \frac{2\Delta\theta_4 \cdot \Delta q \cdot \Delta r}{c\tau} \cdot T \quad (96)$$

Also, although the direction in which the acoustic beam is emitted is varied such that the slant plane H7 constituting the scanning surface swings about the y-axis while acoustic beam is steered along the slant plane H7, the invention is not limited thereto. Specifically, the slant plane may be replaced by a plane containing an arbitrary first horizontal axis in the xy-plane and a downward-pointing axis which intersects the z-axis in a plane (third plane) containing a second horizontal axis perpendicular to the first horizontal axis and the z-axis.

While the preferred modes of carrying out the invention have thus far been described, the invention is not limited to the foregoing Examples thereof but various changes in design are possible within the scope of the appended claims. For example, the underwater sounding apparatus is not limited to the scanning sonar but may be a sector scanning sonar or a searchlight sonar. When using a sector scanning sonar, it is necessary to take into consideration the dependence of the transmit signal intensity $P_O^2$ and the equivalent beam width $\psi$ on the angle $\phi$ and not on the angle $\theta$. The sector scanning sonar forms a fan-shaped transmitting beam having a specific center angle and tilt angle around a transducer. Then, the sector scanning sonar scans within the fan-shaped transmitting beam with a pencillike receiving beam to detect underwater information from each direction within the transmitting beam. Since the sector scanning sonar can sound only a fan-shaped area with a single transmission of acoustic waves, full-circle sounding is accomplished by mechanically turning the transducer. The tilt angle of the transmitting beam is also controlled mechanically. When using a searchlight sonar, it is not necessary to take into consideration the dependence of the transmit signal intensity $P_O^2$ and the equivalent beam width $\psi$ on the angle $\phi$ or the angle $\phi$. The searchlight sonar transmits a pencillike acoustic wave in one direction at a specific tilt angle from a vibrating element of a transducer. Then, the searchlight sonar detects underwater information from that direction based on a return signal received by the vibrating element. Since the searchlight sonar can sound only a narrow pencillike area with a single transmission of acoustic waves, full-circle sounding is accomplished by mechanically turning the transducer. The tilt angle in which the searchlight sonar transmits the acoustic wave is also controlled mechanically.

In the underwater sounding apparatus to which the prevent invention is applied, the transmit/receive directions of acoustic waves are not limited to directions along the individual surfaces H1-H7 explained in the foregoing individual Examples. The transmit/receive directions may be selected such that volume integration is possible in specific two-dimensional directions and a one-dimensional direction intersecting the two-dimensional directions.

Also, the underwater sounding apparatus to which the prevent invention is applied may be configured to scan along the individual surfaces H1-H7 with acoustic waves transmitted and received by the transducer 2 in a single transmit/receive cycle or to scan along the individual surfaces H1-H7 with acoustic waves successively transmitted and received multiple times.

Also, fish quantity N within a fish school FS is calculated in the foregoing individual Examples, the invention is not limited thereto but may calculate "N×Ts."

Also, a single receiving beam is successively formed in multiple directions in the individual surfaces H1-H7 in the foregoing individual Examples, the invention is not limited thereto but may simultaneously form a large number of one-dimensionally converged receiving beams in multiple directions in the individual surfaces H1-H7.

Although "the acoustic beam transmitted along the yz-plane," "the acoustic beam transmitted along the slant plane H1," "the acoustic beam transmitted along the twisted vertical plane H," "the acoustic beam transmitted along the twisted slant plane H3," "the acoustic beam transmitted along the umbrellalike surface H4," "the acoustic beam is steered along the vertical plane H5," "the acoustic beam transmitted along the umbrellalike surface H6" and "the acoustic beam transmitted along the slant plane H7" mentioned in the foregoing individual principles of calculation and Examples have been described as being transmitted along the respective surfaces H1-H7 in the model of the cylindrical coordinate system and the model of the spherical coordinate system, the acoustic beams are transmitted in directions generally along the respective surfaces H1-H7 in practice.

Also, while the foregoing individual principles of calculation and Examples have been described for a case where the transducer 2 has a spherical shape or a cylindrical shape, these principles of calculation and Examples can be adapted to a transducer having any desired shape if $P_o^2(i,j)$ and $\psi(i,j)$ are substituted for $P_o^2(i\Delta\theta)$ and $\psi(i\Delta\theta)$, respectively, where $(i,j)$ designates a beam number.

As thus far described, the scanning sonar 1 of each of the aforementioned Examples includes the transducer 2 which transmits the acoustic beam in a specific direction underwater from the ship 7 and receives an echo reflected from inside a fish school FS hit by the acoustic beam and the signal processing section 5 which processes signals picked up by the receiving beam. This signal processing section integrates equivalent input sound signals obtained by the receiving beam in three-dimensional directions including two-dimensional directions along the individual surfaces H1-H7 and a one-dimensional direction intersecting the respective surfaces H1-H7. The scanning sonar 1 then calculates the approximate number N of fishes within a fish school FS from a value of integration thus obtained. Therefore, it is possible to easily calculate the approximate number N of fishes within the fish school FS in a quantitative manner without recognizing a relationship between a scanned image in horizontal mode and a scanned image in vertical mode. Moreover, since calculation is not affected by experience of fishermen, the calculated number N of fishes within the fish school FS does not vary so much.

While the present invention has been described with reference to the aforementioned preferred embodiments, the invention is not limited thereto but is applicable in various forms without departing from the scope and spirit of this invention.

INDUSTRIAL APPLICABILITY

The present invention is applicable to an underwater sounding apparatus, such as a scanning sonar or a bottom sounding sonar apparatus, for detecting fish schools by transmitting an ultrasonic signal and forming a receiving beam.

The invention claimed is:

1. An underwater sounding apparatus comprising:
   a transmitter for transmitting an acoustic signal in a specific direction underwater from a ship;
   a receiver for receiving an echo reflected from a fish school resulting from said transmitted acoustic signal by means of a receiving beam; and
   a signal processor for processing signals picked up by said receiver and calculating fish quantity information about said fish school by volumetrically integrating data along specific directions in three dimensions, said data obtained by said receiving beam,
   wherein said data is equivalent input sound intensity which has been compensated for spreading loss and absorption loss of the transmitted and received acoustic signal.

2. The underwater sounding apparatus as recited in claim 1, wherein said receiver can form the receiving beam in specific directions in two dimensions and said signal processor volumetrically integrates said data along the directions in three dimensions including said directions in two dimensions and a specific direction in one dimension intersecting said directions in two dimensions.

3. The underwater sounding apparatus as recited in claim 2, wherein said specific directions in two dimensions are directions generally along a plane with contains a first horizontal axis in a first plane containing a first axis extending in a horizontally forward direction from the ship and a second axis extending in a horizontal direction perpendicular to said first axis from said ship, as well as a downward-pointing axis in a third plane containing a second horizontal axis extending perpendicular to said first horizontal axis in the first plane and third axis extending vertically downward from said ship, and said specific direction in one dimension is a moving direction of said ship.

4. The underwater sounding apparatus as recited in claim 3, wherein said first horizontal axis is said second axis and said downward-pointing axis is said third axis.

5. The underwater sounding apparatus as recited in claim 3, wherein said first horizontal axis is said second axis and said downward-pointing axis is an axis which intersects said third axis.

6. The underwater sounding apparatus as recited in claim 3, wherein said first horizontal axis is an axis which intersects said second axis and said downward-pointing axis is said third axis.

7. The underwater sounding apparatus as recited in claim 3, wherein said first horizontal axis is an axis which intersects said second axis and said downward-pointing axis is an axis which intersects said third axis.

8. The underwater sounding apparatus as recited in claim 2, wherein said specific directions two-dimensions are directions generally along an umbrellalike surface which is formed around said ship, intersecting a first plane containing a first axis extending in a horizontally forward direction from the ship and a second axis extending in a horizontal direction perpendicular to said first axis, and said specific direction in one dimension is a moving direction of said ship.

9. The underwater sounding apparatus as recited in claim 2, wherein said specific directions in two dimensions are directions generally along a second plane which contains a second axis extending in a horizontal direction perpendicular to a first axis extending in a horizontally forward direction from the ship and a third axis extending vertically downward from said ship, and said specific direction in one dimension is a direction in which said second plane is rotated generally about the third axis extending vertically downward from said ship.

10. The underwater sounding apparatus as recited in claim 2, wherein said specific directions in two dimensions are directions generally along an umbrellalike surface which is formed around said ship, intersecting a first plane containing a first axis extending in a horizontally forward direction from the ship and a second axis extending in a horizontal direction perpendicular to said first axis, and said specific direction in one dimension is a direction in which an angle of intersection between said first plane and said umbrellalike surface is varied.

11. The underwater sounding apparatus as recited in claim 2, wherein said specific directions in two dimensions are directions generally along a plane which contains a first horizontal axis in a first plane containing a first axis extending in a horizontally forward direction from the ship and a second axis extending in a horizontal direction perpendicular to said first axis from said ship, as well as a downward-pointing axis in a third plane containing a second horizontal axis extending perpendicular to said first horizontal axis in the first plane and a third axis extending vertically downward from said ship, said downward-pointing axis intersecting said third axis, and said specific direction in one dimension is a direction in which an angle of intersection between said third axis and said downward-pointing axis is varied.

12. A method of calculating fish quantity information about a fish school comprising:
 a step of transmitting an acoustic beam in a specific direction underwater;
 a step of receiving an echo reflected from the fish school resulting from said transmitted acoustic signal by means of a receiving beam; and
 a step of calculating the fish quantity information about said fish school by volumetrically integrating data along specific directions in three dimensions, said data obtained by said receiving beam,
 wherein said data is equivalent input sound intensity which has been compensated for spreading loss and absorption loss of the transmitted and received acoustic signal.

13. A method of calculating fish quantity information about a fish school comprising:
 a step of transmitting an acoustic beam in specific directions in two dimensions underwater;
 a step of receiving an echo reflected from the fish school resulting from said transmitted acoustic signal by means of a receiving beam; and
 a step of calculating the fish quantity information about said fish school by volumetrically integrating data along said directions in two dimensions and a specific direction in one dimension intersecting said directions in two dimensions, said data obtained by said receiving beam,
 wherein said data is equivalent input sound intensity which has been compensated for spreading loss and absorption loss of the transmitted and received acoustic signal.

* * * * *

UNITED STATES PATENT AND TRADEMARK OFFICE
CERTIFICATE OF CORRECTION

PATENT NO. : 7,768,875 B2
APPLICATION NO. : 11/662188
DATED : August 3, 2010
INVENTOR(S) : Kohji Iida et al.

It is certified that error appears in the above-identified patent and that said Letters Patent is hereby corrected as shown below:

ON THE TITLE PAGE:

At item (73), Assignee, change:

"Furuno Electric Co., Ltd., Hakodate (JP)"

To

-- Furuno Electric Co., Ltd., Nishinomiya-City (JP); National University Corporation Hokkaido University, Hakodate-City (JP) --.

Signed and Sealed this
Twenty-second Day of March, 2011

David J. Kappos
*Director of the United States Patent and Trademark Office*